United States Patent [19]
Preas et al.

[11] Patent Number: 5,912,889
[45] Date of Patent: Jun. 15, 1999

[54] ATM SWITCH WITH OUTPUT PORT CLUSTERING FOR DYNAMICALLY ALLOCATING BANDWIDTH BETWEEN PORTS

[75] Inventors: Bryan T. Preas; Helen M. Davis; Alan G. Bell, all of Palo Alto; Joseph B. Lyles, Mountain View, all of Calif.

[73] Assignee: Xerox Corporation, Stamford, Conn.

[21] Appl. No.: 08/754,727

[22] Filed: Nov. 21, 1996

[51] Int. Cl.[6] .................................................. H04L 12/56
[52] U.S. Cl. ........................ 370/359; 370/395; 370/414
[58] Field of Search ..................................... 370/357, 359, 370/362, 364, 386, 412, 413, 414, 395, 398; 340/825.89

[56] References Cited

U.S. PATENT DOCUMENTS

| | | | |
|---|---|---|---|
| 4,531,238 | 7/1985 | Rawson et al. | 455/60.1 |
| 5,130,984 | 7/1992 | Cisneros | 370/94.1 |
| 5,305,311 | 4/1994 | Lyles | 370/60 |
| 5,327,420 | 7/1994 | Lyles | 370/60 |
| 5,412,648 | 5/1995 | Fan | 370/414 |
| 5,502,718 | 3/1996 | Lane et al. | 370/414 |
| 5,517,495 | 5/1996 | Lund et al. | 370/414 |
| 5,519,698 | 5/1996 | Lyles et al. | 370/60 |

OTHER PUBLICATIONS

McKeown, N., Prabhakar, B., "Scheduling Multicast Cells in an Input–Queued Switch," *IEEE Infocom '96*, vol. 1, pp. 271–278, Mar. 1996.

MMC Networks, "ATM Switch Engine Chip Set," ATMS2000, Mar. 6, 1996, pp. 2/95–5.

TranSwitch *CellBus*™ Logical Layer Specification, Edition 3.3, Mar. 16, 1994, pp. 1–13.

U.S. Patent Application No. 08/447,673 entitled "Device and Method for Use of a Reservation Ring to Compute Crossbar Set–Up Parameters in an ATM Switch" to Joseph B. Lyles et al., filed May 23, 1995.

U.S. Provisional Patent Application No. 60/020,642 entitled "Rate Shaping in Per–Flow Output Queued Routing Mechanisms Having Output Links Servicing Multiple Physical Layers" to Christopher J. Kappler et al., filed Jun. 27, 1996.

*Primary Examiner*—Chi H. Pham
*Assistant Examiner*—Ricky Q. Ngo

[57] ABSTRACT

Ports of an ATM (Asynchronous Transfer Mode) switch are consolidated into cluster modules to increase the aggregate throughput of the switch. Packets are routed between cluster modules using an intercluster switching network. The intercluster switching network includes a plurality of input channels and output channels. During a switch cycle, a maximum of "K" packets are delivered to each of the output channels of the intercluster switching network. This maximum of "K" packets is a speedup per cluster module that is shared between ports of each cluster module. Consequently, each output port of a cluster module operates with a peak speedup of up to "K" packets per switch cycle thereby increasing the aggregate throughput of the switch.

24 Claims, 29 Drawing Sheets

| Initialize: | Unit: | C-Control | counter | FTR | STR | TT | BT |
|---|---|---|---|---|---|---|---|
| | 1 (D) | N.A. | N.A. | N.A. | N.A. | TRUE | TRUE |
| | 2 (ND) | + | 0 | FALSE | FALSE | FALSE | FALSE |
| | 3 (ND) | + | 0 | FALSE | FALSE | FALSE | FALSE |
| | 4 (ND) | + | 0 | FALSE | FALSE | FALSE | FALSE |
| Stage 1: | Unit: | C-Control | counter | FTR | STR | TT | BT |
| | 1 (D) | N.A. | N.A. | N.A. | N.A. | FALSE | FALSE |
| | 2 (ND) | + | 1 | TRUE | FALSE | TRUE | FALSE |
| | 3 (ND) | + | 1 | FALSE | FALSE | FALSE | FALSE |
| | 4 (ND) | + | 1 | TRUE | FALSE | FALSE | TRUE |
| Stage 2: | Unit: | C-Control | counter | FTR | STR | TT | BT |
| | 1 (D) | N.A. | N.A. | N.A. | N.A. | FALSE | FALSE |
| | 2 (ND) | # | 1 | TRUE | FALSE | FALSE | FALSE |
| | 3 (ND) | + | 2 | TRUE | TRUE | TRUE | TRUE |
| | 4 (ND) | # | 1 | TRUE | FALSE | FALSE | FALSE |
| Stage 3: | Unit: | C-Control | counter | FTR | STR | TT | BT |
| | 1 (D) | N.A. | N.A. | N.A. | N.A. | FALSE | FALSE |
| | 2 (ND) | # | 1 | TRUE | TRUE | FALSE | TRUE |
| | 3 (ND) | - | 1 | TRUE | TRUE | FALSE | FALSE |
| | 4 (ND) | # | 1 | TRUE | TRUE | TRUE | FALSE |
| Stage 4: | Unit: | C-Control | counter | FTR | STR | TT | BT |
| | 1 (D) | N.A. | N.A. | N.A. | N.A. | TRUE | TRUE |
| | 2 (ND) | - | 0 | TRUE | TRUE | FALSE | FALSE |
| | 3 (ND) | - | 0 | TRUE | TRUE | FALSE | FALSE |
| | 4 (ND) | - | 0 | TRUE | TRUE | FALSE | FALSE |

*FIG. 22*

| | Unit: | counter | p-cnt | length | new length | T-in | req-in | T-out | req-out |
|---|---|---|---|---|---|---|---|---|---|
| Initialize: | 0 (P) | 0 | 0 | 8 | 8 | | | TRUE | pseudo-8 |
| | 1 (D) | 0 | N.A. | 8 | 8 | | | FALSE | req-1 |
| | 2 (ND) | 0 | N.A. | 8 | 8 | | | FALSE | req-2 |
| | 3 (ND) | 0 | N.A. | 8 | 8 | | | FALSE | req-3 |
| | 4 (ND) | 0 | N.A. | 8 | 8 | | | FALSE | req-4 |
| Stage 1: | 0 (P) | 1 | 1 | 8 | 8 | T-in | req-in | T-out | req-out |
| | 1 (D) | 1 | N.A. | 8 | 8 | FALSE | req-4 | TRUE | req-4 |
| | 2 (ND) | 1 | N.A. | 8 | 8 | TRUE | pseudo-8 | TRUE | pseudo-8 |
| | 3 (ND) | 1 | N.A. | 8 | 8 | FALSE | req-1 | FALSE | req-1 |
| | 4 (ND) | 1 | N.A. | 8 | 8 | FALSE | req-2 | FALSE | req-2 |
| Stage 2: | 0 (P) | 2 | 2 | 8 | 8 | T-in | req-in | T-out | req-out |
| | 1 (D) | 2 | N.A. | 8 | 8 | FALSE | req-3 | FALSE | req-3 |
| | 2 (ND) | 2 | N.A. | 8 | 8 | TRUE | req-4 | TRUE | req-4 |
| | 3 (ND) | 2 | N.A. | 8 | 8 | TRUE | pseudo-8 | TRUE | pseudo-8 |
| | 4 (ND) | 2 | N.A. | 8 | 8 | FALSE | req-1 | FALSE | req-1 |
| Stage 3: | 0 (P) | 3 | 3 | 8 | 8 | T-in | req-in | T-out | req-out |
| | 1 (D) | 3 | N.A. | 8 | 8 | FALSE | req-2 | FALSE | req-2 |
| | 2 (ND) | 3 | N.A. | 8 | 8 | TRUE | req-3 | TRUE | req-3 |
| | 3 (ND) | 3 | N.A. | 8 | 8 | TRUE | req-4 | TRUE | req-4 |
| | 4 (ND) | 3 | N.A. | 8 | 8 | FALSE | pseudo-8 | FALSE | pseudo-8 |
| Stage 4: | 0 (P) | 4 | 4 | 8 | 8 | T-in | req-in | T-out | req-out |
| | 1 (D) | 4 | N.A. | 8 | 8 | FALSE | req-1 | TRUE | req-1 |
| | 2 (ND) | 4 | N.A. | 8 | 8 | TRUE | req-2 | TRUE | req-2 |
| | 3 (ND) | 4 | N.A. | 8 | 8 | TRUE | req-3 | TRUE | req-3 |
| | 4 (ND) | 4 | N.A. | 8 | 8 | TRUE | req-4 | TRUE | req-4 |
| | | | | | | | pseudo-8 | | pseudo-8 |

FIG. 26

| Stage 5: | Unit: | counter | p-cnt | length | new length | T-in | req-in | T-out | req-out |
|---|---|---|---|---|---|---|---|---|---|
| | 0 (P) | 5 | 0 | 8 | 5 | TRUE | pseudo-8 | FALSE | pseudo-8 |
| | 1 (D) | 5 | N.A. | 8 | 8 | TRUE | req-1 | TRUE | req-1 |
| | 2 (ND) | 5 | N.A. | 8 | 8 | TRUE | req-2 | TRUE | req-2 |
| | 3 (ND) | 5 | N.A. | 8 | 8 | TRUE | req-3 | TRUE | req-3 |
| | 4 (ND) | 5 | N.A. | 8 | 8 | TRUE | req-4 | TRUE | req-4 |
| Stage 6: | Unit: | counter | p-cnt | length | new length | T-in | req-in | T-out | req-out |
| | 0 (P) | 6 | 1 | 8 | 5 | TRUE | req-4 | FALSE | req-4 |
| | 1 (D) | 6 | N.A. | 8 | 5 | FALSE | pseudo-5 | FALSE | pseudo-5 |
| | 2 (ND) | 6 | N.A. | 8 | 8 | TRUE | req-1 | TRUE | req-1 |
| | 3 (ND) | 6 | N.A. | 8 | 8 | TRUE | req-2 | TRUE | req-2 |
| | 4 (ND) | 6 | N.A. | 8 | 8 | TRUE | req-3 | TRUE | req-3 |
| Stage 7: | Unit: | counter | p-cnt | length | new length | T-in | req-in | T-out | req-out |
| | 0 (P) | 7 | 2 | 8 | 5 | TRUE | req-3 | FALSE | req-3 |
| | 1 (D) | 7 | N.A. | 8 | 5 | FALSE | req-4 | TRUE | req-4 |
| | 2 (ND) | 7 | N.A. | 8 | 5 | FALSE | pseudo-5 | FALSE | pseudo-5 |
| | 3 (ND) | 7 | N.A. | 8 | 8 | TRUE | req-1 | TRUE | req-1 |
| | 4 (ND) | 7 | N.A. | 8 | 8 | TRUE | req-2 | TRUE | req-2 |
| Stage 8: | Unit: | counter | p-cnt | length | new length | T-in | req-in | T-out | req-out |
| | 0 (P) | 8 | 3 | 8 | 5 | TRUE | req-2 | FALSE | req-2 |
| | 1 (D) | 8 | N.A. | 8 | 5 | FALSE | req-3 | TRUE | req-3 |
| | 2 (ND) | 8 | N.A. | 8 | 5 | FALSE | req-4 | TRUE | req-4 |
| | 3 (ND) | 8 | N.A. | 8 | 5 | FALSE | pseudo-5 | FALSE | pseudo-5 |
| | 4 (ND) | 8 | N.A. | 8 | 8 | TRUE | req-1 | TRUE | req-1 |
| Stage 9: | Unit: | counter | p-cnt | length | new length | T-in | req-in | T-out | req-out |
| | 0 (P) | 0 | 4 | 8 | 5 | TRUE | req-1 | TRUE | req-1 |
| | 1 (D) | 0 | N.A. | 8 | 5 | FALSE | req-2 | FALSE | |
| | 2 (ND) | 0 | N.A. | 8 | 5 | FALSE | req-3 | FALSE | |
| | 3 (ND) | 0 | N.A. | 8 | 5 | FALSE | req-4 | FALSE | |
| | 4 (ND) | 0 | N.A. | 8 | 5 | FALSE | pseudo-5 | | |

*FIG. 27*

| Initialize: | Unit: | counter | p - cnt | length | T - out | req - out |
|---|---|---|---|---|---|---|
| | 0 (P) | 0 | 0 | 5 | TRUE | pseudo - 5 |
| | 1 (D) | 0 | N.A. | 5 | FALSE | new - req - 1 |
| | 2 (ND) | 0 | N.A. | 5 | FALSE | new - req - 2 |
| | 3 (ND) | 0 | N.A. | 5 | FALSE | new - req - 3 |
| | 4 (ND) | 0 | N.A. | 5 | FALSE | new - req - 4 |

ATM SWITCH WITH OUTPUT PORT CLUSTERING FOR DYNAMICALLY ALLOCATING BANDWIDTH BETWEEN PORTS

Cross reference is made to the co-pending U.S. patent applications Ser. Nos. 08/754,734, 08/754,726, and 08/754,688 filed concurrently herewith, and entitled "Arbitration Ring For Accessing A Limited Bandwidth Switching Network," "Method For Supporting Multicast Capabilities In Switching Networks With A Reservation Ring," and "Arbitration Ring With Automatic Sizing For A Partially Populated Switching Network", respectively.

The present invention relates generally to communications networks, and more particularly to an ATM (Asynchronous Transfer Mode) switch that consolidates individual port bandwidth into clusters to increase the aggregate bandwidth of each port.

BACKGROUND OF THE INVENTION

The ATM (Asynchronous Transfer Mode) protocol is an example of a packet switched network protocol that supports a plurality of communications services such as voice, video, and data. Information is transmitted over an ATM network using fixed-sized data packets called cells. Routing information that is used to direct a cell to its destination is contained in the cell's header. The cell routing information, which is determined at call setup time, specifies a fixed route through a switching network. Depending on the particular fixed route defined through a network, a cell may travel through a series of ATM switches before arriving at its destination.

As ATM networks become common and are used as office networks, the availability of small scaleable switches becomes increasingly desirable. ATM switches that are readily scaleable support a number of different configurations at once. Also, a switch that is readily scaleable operates efficiently when its port capacity is partially utilized (or populated). For example, a switch that is readily scaleable can be used to deploy multiple versions of the switch using identical printed circuit boards, thereby reducing manufacturing and development costs. It would, therefore, be advantageous for an ATM switch to operate efficiently using identical circuit boards when the number of ports vary between configurations. Also, it would be desirable to provide an ATM switch that automatically determines while in operation how many ports of the ATM switch are in use during a switch cycle.

In an office environment these small, scaleable switches can be used as "ATM extension cords" to connect office equipment to larger and more central switches via a single physical connection. When used in this manner small switches do not necessarily need to support the throughput levels required by a central switch. It is, therefore, desirable that this small scaleable switch architecture operate efficiently while operating with limited switching bandwidth. Small scaleable switches with limited bandwidth switching networks have a set of output ports to which the switching network can transmit a limited number of cells each switch cycle. In general, a switch with limited switching bandwidth operates with a throughput that is less than the aggregate maximum link rate at which the input ports can theoretically operate. In addition to operating with limited bandwidth, it is desirable to have a small switch architecture that ensures that cell loss is infrequent, while supporting traffic priorities and multicast operations.

A switch that operates with a limited bandwidth may be "blocking" because such a switch is unable to generate all possible one-to-one input port to output port mappings in a single switch cycle. In a switch that may be blocking, input buffering is required in order to avoid cell loss. Input buffering is also desirable even in the presence of output buffering. For example, input buffers are necessary when output buffers are incapable of queuing the maximum number of cells that might be destined for any particular output buffer during any single switch cycle. As described in U.S. Pat. No. 5,305,311, the combination of input and output buffering provides an effective method for limiting the output buffer bandwidth required to achieve loss-less switching.

It is well known, however, that switches that use input queuing and deliver one cell to an output port per switch cycle suffer from head of queue blocking. Generally, head of queue blocking will cause a gross degradation in throughput. U.S. Pat. No. 5,305,311, discloses the notion of speeding up each output port by a factor of "k" (e.g. k=2) each switch cycle to minimize head of queue blocking. This speedup of "k" per output port increases throughput from approximately 58% for k=1 (purely input queued) to approximately 89% for k=2 and nearly 100% for k=4 and above.

One resource that limits the amount of bandwidth available when designing a small scaleable switch is the number of pins available on integrated circuits used to build the switch. For example, in a bus-based switching network, the width of the bus limits the bandwidth of the bus. Besides the bus width, the bandwidth for a bus-based switching network is limited by the clock speed of the switch, and the number of ports on the switch. Consequently, in a small scaleable switch with a bus based switching network, the bandwidth at which the switch can operate is often constrained by the number of wires that link input and output ports of the switching network.

SUMMARY OF THE INVENTION

In accordance with one aspect of the invention, there is provided a switch that includes a switching network that has N input channels and M output channels, where N and M are integers greater than one. The switching network performs routing operations each switch cycle for routing up to K data packets to each of the M output channels from selected ones of the N input channels, where K is an integer greater than one. Q cluster modules are coupled to the N input channels and the M output channels of the switching network. Each of the Q cluster modules are coupled to at least one of different ones of I input ports and less than K of different ones of J output ports, where I is an integer at least equal to N, and J is an integer greater than M. The Q cluster modules coact with the switching network to route as few as zero and as many as K fixed sized data packets to selected ones of the J output ports from the I input ports each switch cycle of the switching network.

In accordance with another aspect of the invention, there is provided a switch for routing data packets from designated ones of M input ports to designated ones of M output ports. The switch includes a switching network having N input channels, and N output channels. The switching network routes up to K data packets to each of the N output channels during a switch cycle of the switch, where K is an integer greater than one. An arbiter resolves conflicts between the N input channels when more than K of the N input channels contend for a single one of the N output channels. Q cluster modules are operatively coupled to the arbiter and the switching network. Each of the Q cluster modules receives at most K data packets from selected ones of the N input channels through the switching network during the switch cycle. The Q cluster modules service the M input ports and the M output ports, where M is an integer greater than N. The Q cluster modules increase average throughput of the switch by routing up to K fixed-sized data packet to selected ones of the M output ports during the switch cycle.

In accordance with yet another aspect of the invention, there is provided a switch for routing data packets from designated ones of M input ports to designated ones of M output ports. The switch includes a switching network having N input channels, and N output channels. The switching network has sufficient bandwidth for routing up to B data packets to the N output channels during a switch cycle of the switch. Each of the N output channels has a specified channel speedup allocated from the bandwidth of the switching network. Q cluster modules are operatively coupled to the switching network. The Q cluster modules receive data packets at a rate up to the specified channel speedup from selected ones of the N input channels through the switching network during the switch cycle. The Q cluster modules service the M input ports and the M output ports. The specified channel speedup of each cluster module is allocated independently between each output port coupled thereto. An arbiter dynamically adjusts the specified channel speedup and the allocated port speedup between the N output channels and the M output ports each switch cycle to increase aggregate bandwidth of traffic through the switch.

BRIEF DESCRIPTION OF THE DRAWINGS

These and other aspects of the invention will become apparent from the following description which illustrates a preferred embodiment of the invention read in conjunction with the accompanying drawings wherein the same reference numerals have been applied to like parts and in which:

FIGS. 21 and 22 illustrates a manner of operating the reservation ring shown in FIG. 18;

FIGS. 25, 26, 27, and 28 illustrates a manner for operating the reservation ring shown in FIG. 11;

FIG. 29 illustrates a flow chart detailing yet another embodiment for automatically sizing the length of a reservation ring using a configuration mask register.

DETAILED DESCRIPTION

A. Modular Hierarchical Switch Architecture

Figure 1:
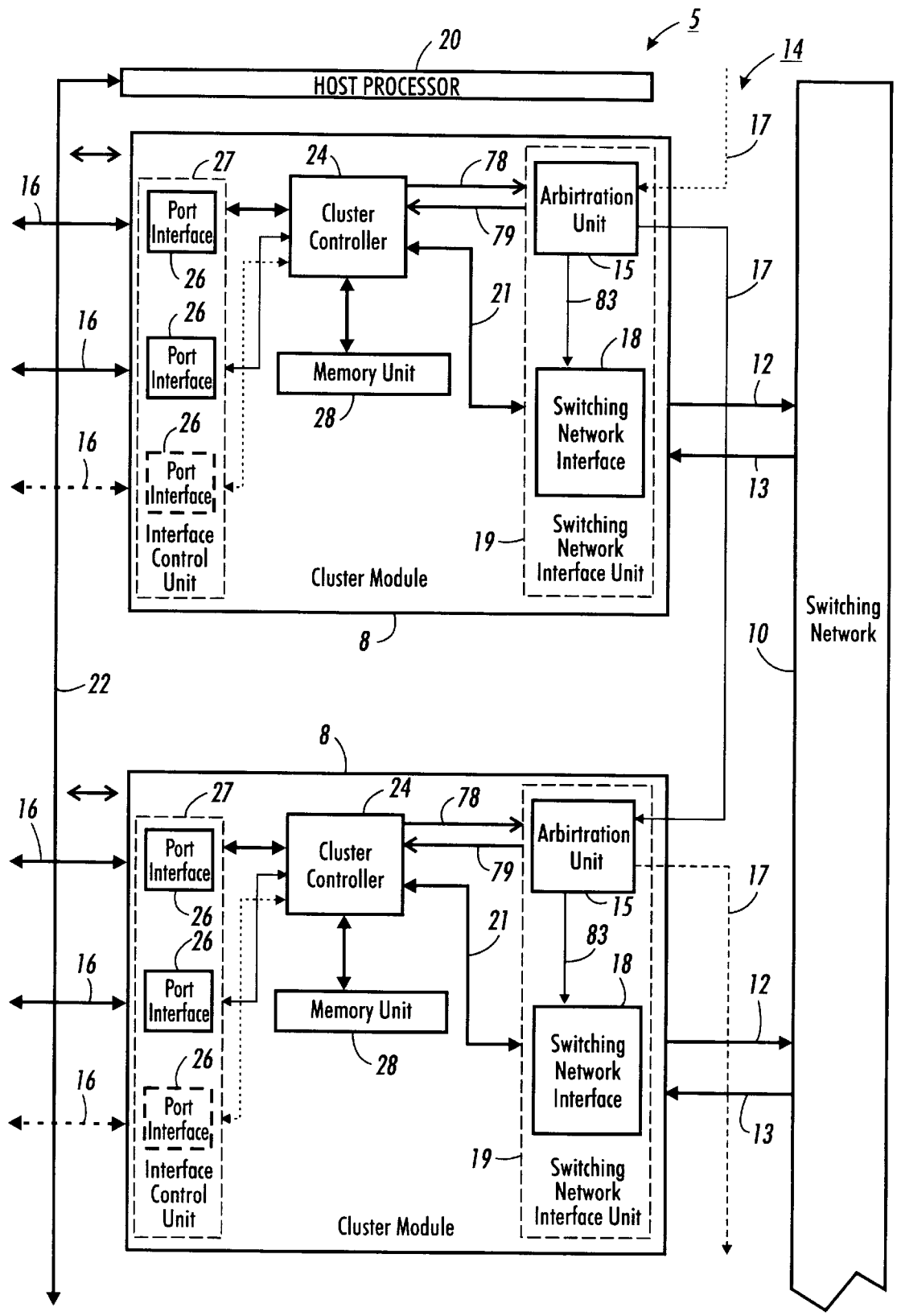
FIG. 1 schematically illustrates a modular hierarchical ATM (Asynchronous Transfer Mode) switch incorporating the present invention.

Referring now to the drawings where the showings are for the purpose of describing an embodiment of the invention and not for limiting same, FIG. 1 illustrates a general block diagram of an ATM (Asynchronous Transfer Mode) switch 5 incorporating the present invention. It will be appreciated by those skilled in the art that the present invention is not limited to an ATM switch but can be generalized to any packet switched network. It will also be appreciated that unlike ATM networks, other packet switched networks do not require fixed-sized data packets but instead require only that data packets not exceed a maximum permissible transport unit size (MTU).

The switch 5 includes a plurality of cluster modules 8 that are coupled by switching network channels 12 and 13 to an intercluster switching network 10. Each cluster module 8 has one or more input/output (I/O) ports 16. The architecture of the switch 5 is both modular and hierarchical. The modularity of the switch permits the switch to be readily scaleable, while the hierarchical nature of the switch increases average throughput of the switch by enabling ports to share switching bandwidth and by allowing traffic destined for ports 16 on the same cluster module 8 to avoid traversing the switching network 10. Access by a cluster module 8 to the intercluster switching network 10 is scheduled using an arbitration or reservation ring 14. The reservation ring 14 is a distributed arbiter that is implemented as a linear systolic array of finite state machines or arbitration units 15 that are coupled by lines 17. Each arbitration unit 15 in the ring 14 communicates with its immediate neighbor. Among the advantages of a linear systolic array, such as reservation ring 14, are that all communications are local and electrical loads do not grow with array size. This enables linear scaling of the switch 5.

Switching of cells or packets through intercluster switching network 10 can be performed by any one of a plurality of switching networks. For example, the intercluster switching network 10 can be implemented using either a cross bar network, a bus network, or batcher/banyan routing network. The makeup of intercluster switching network 10 depends on a number of factors that include the number of cluster modules 8 coupled to switching network 10, and the bandwidth requirements of the switch 5. Typically, a bus architecture is used with a switch 5 that connects a moderate number of ports, while a cross bar architecture may be used to connect a larger number of ports. Each cluster module 8 accesses the intercluster switching network 10 while servicing a plurality of ports 16.

The switch 5 includes a host processor 20 which communicates over host control bus 22. The host processor 20 responds to control cells, such as OAM cells (Operations, Administration, and Maintenance), manages virtual circuits, allocates queue buffers, configures the VCI/VPI (virtual circuit index/virtual path index) maps, sets switch registers 42 (shown in FIG. 2), and responds to errors from cluster modules 8. The host processor 20 includes serial and parallel interfaces (not shown) that can be used for communicating control, monitoring information, and debugging problems in the switch 5. Communication between host processor 20 and cluster controller 24 is asynchronous. The host processor 20 can be any standard processing unit such as the Motorola MC68360 processor.

Each cluster module 8 includes a cluster controller 24, a memory unit 28, a port interface unit 27, and at least one switching network interface unit 19. The cluster controller 24, an example of which is discussed below, provides the control and primary data path of the cluster module 8. The memory unit 28, which is external to the cluster controller 24, buffers cells and stores cell mapping information. Because the memory unit 28 is external to the cluster controller 24, the amount of memory in unit 28 can be readily altered. This modular aspect of switch 5 provides flexibility when installing adequate cell buffering for specified traffic management requirements.

The port interface unit 27 of each cluster module 8 contains a plurality of port interfaces 26. Each port interface 26 is an interface for receiving and transmitting cells over a network such as a Synchronous Optical NETwork (SONET). For example, when a port interface 26 is coupled to a SONET interface (not shown) through an external port 16, the interface control unit 27 receives and converts a SONET serial stream into an input cell byte stream which is stored in a first internal FIFO (first-in first-out) memory queue (not shown). In addition, the interface control unit accepts an output cell byte stream, which is independent from the input cell byte stream, into a second internal FIFO memory queue (not shown) before converting it into an appropriate SONET serial stream for transmission over fiber optic cables (not shown). Examples of interface control units that perform this or most of this functionality are the TI TDC1500, the IGT WAC-013-A, and the PMC SUNI-LITE. Alternatively, a port interface 26 can provide interface control to other networks such as radio, and microwave.

The routing of packets through switch 5 is hierarchically organized. Specifically, packets do not necessarily route through intercluster switching network 10. Rather, packets destined to ports within a cluster module 8 are routed without accessing the intercluster switching network 10. For example, intra-cluster communication occurs between two hosts, such as two workstations, that are each coupled via a SONET link to a port 16 of a single cluster module 8. More specifically, intra-cluster communication occurs when two ports 16 of a cluster module 8 do not transmit packets over the intercluster switching network 10. This hierarchical aspect of the switch 5 reduces the bandwidth requirements of intercluster switching network 10 because each cluster module 8 manages its own intra-cluster data traffic. Also, this hierarchical aspect reduces latency for intra-cluster communication since the associated delays with the switching network are avoided.

Accordingly, each cluster module 8 supports both intra-cluster as well as inter-cluster communication. Inter-cluster communication involves switching between ports coupled to different cluster modules 8 using the intercluster switching network 10. Access to the intercluster switching network 10 is gained through the switching network interface unit 19 of each cluster module 8. Each switching network interface unit 19 includes an arbitration unit 15 and a switching network interface 18. A packet of data is initially held by switching network interface 18 until access (or a reservation) to both the switching network 10 and an output channel 13 of switching network 10 is won (or made) by arbitration unit 15. The method for arbitrating access to the switching network 10 over reservation ring 14 is discussed in detail below.

Figure 2:
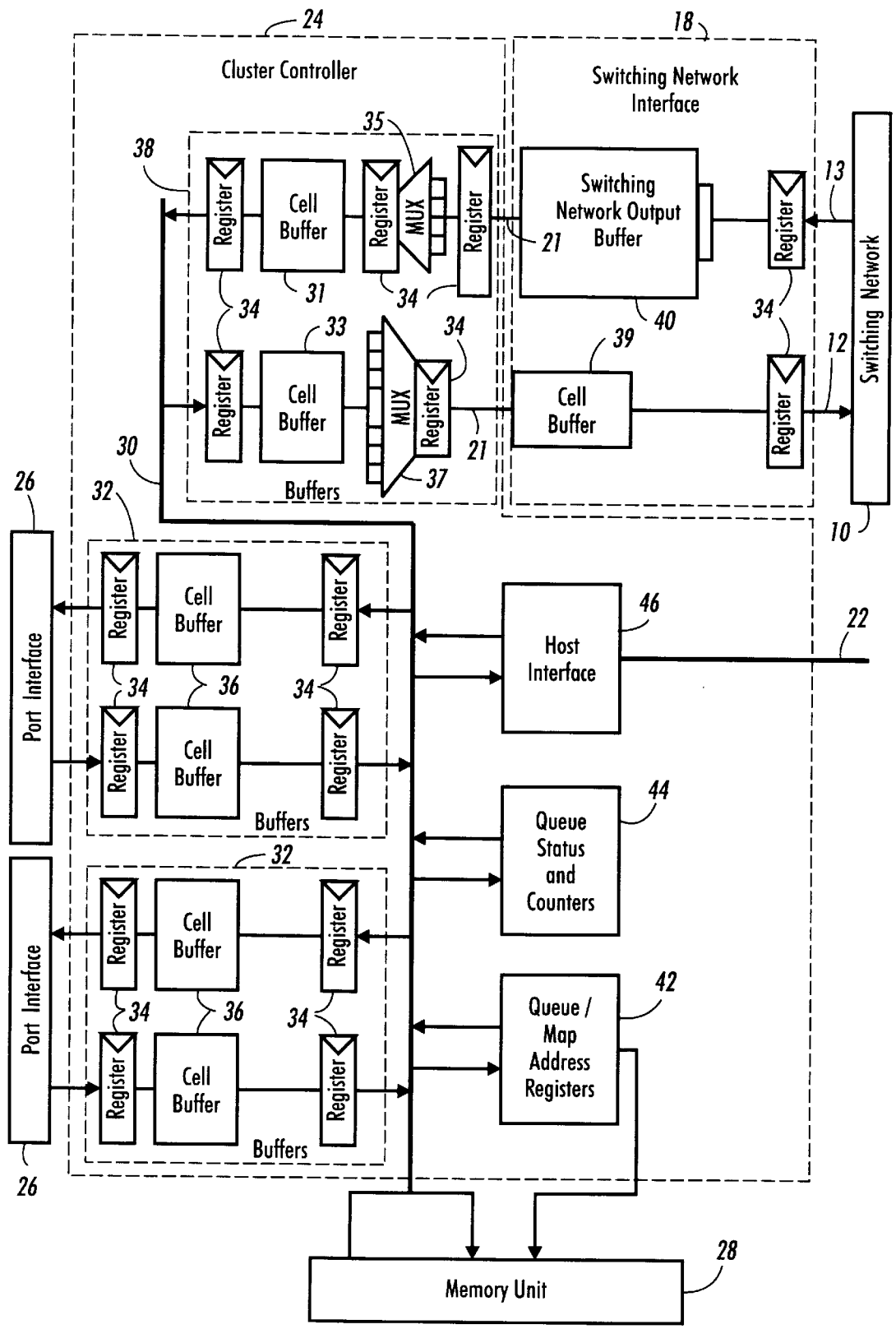
FIG. 2 schematically illustrates a data path diagram of the cluster modules shown in FIG. 1.

FIG. 2 illustrates a data path diagram of the cluster module 8 shown in FIG. 1. Data is routed through the cluster controller 24 using a shared memory bus 30. Access to bandwidth of shared memory bus 30 is scheduled so that access is guaranteed to memory bus 30 by buffers 32 coupled to interface control unit 26, by buffers 38 coupled to switching network interface 18, and by the host interface 46. One form of scheduling is round robin scheduling. Another form of scheduling is dynamic scheduling that assigns varying levels of priority for access to bandwidth of shared memory bus 30. Queue/map address registers 42, and queue status and counters 44 are coupled to shared memory bus 30 and are used for controlling data stored in memory 28.

Cluster controller 24 communicates with each port interface 26 through a set of port buffers that are indicated generally by reference numeral 32. FIG. 2 shows cluster controller communicating with two port interfaces 26. Each set of port buffers 32 include registers 34 that transmit cell data to and from cell buffers 36. Cell buffers 36 provide temporary storage for a cell before acquiring access to shared memory bus 30. In addition, host processor 20 communicates with a cluster controller 24 through processor interface 46 that is coupled to shared memory bus 30.

Cluster controller 24, also, communicates with switching network interface 18 through a set of buffers indicated by reference numeral 38. The set of buffers 38 include cell buffers 31 and 33, registers 34, and multiplexers 35 and 37. Buffer 33 is a pipeline register where cells are stored until access to the switching network 10 is won by arbitration unit 15. The multiplexers 35 and 37 adjust the width of the data path as it changes between the intercluster switching network 10 and the shared memory bus 30. The switching network interface 18, which consists of cell buffer 39 and switching network output buffer 40, communicates through connections 21 with the set of buffers 38. The size of the switching network output buffer 40 is selected to satisfy the requirements of the intercluster switching network 10, the specifics of which are discussed below. In general, the cell buffers could also be used to transfer data across clock domains (e.g., different logic units running off of different clocks) if the cluster controller 24 operates of at a different frequency than its external interface operates.

The set of buffers 38 and the switching network interface 18 form a pair of double buffers. Communication between the intercluster switching network 10 and the cluster controller 24 is double buffered on the output path so that the transmission of an cell can overlap with the arbitration for a subsequent cell's access to the intercluster switching network 10. Also, communication between the intercluster switching network 10 and the cluster controller 24 is double buffered on the input path so that receiving a cell from the switching network is independent and concurrent with the transferring of cell data to memory unit 28.

Figure 3:
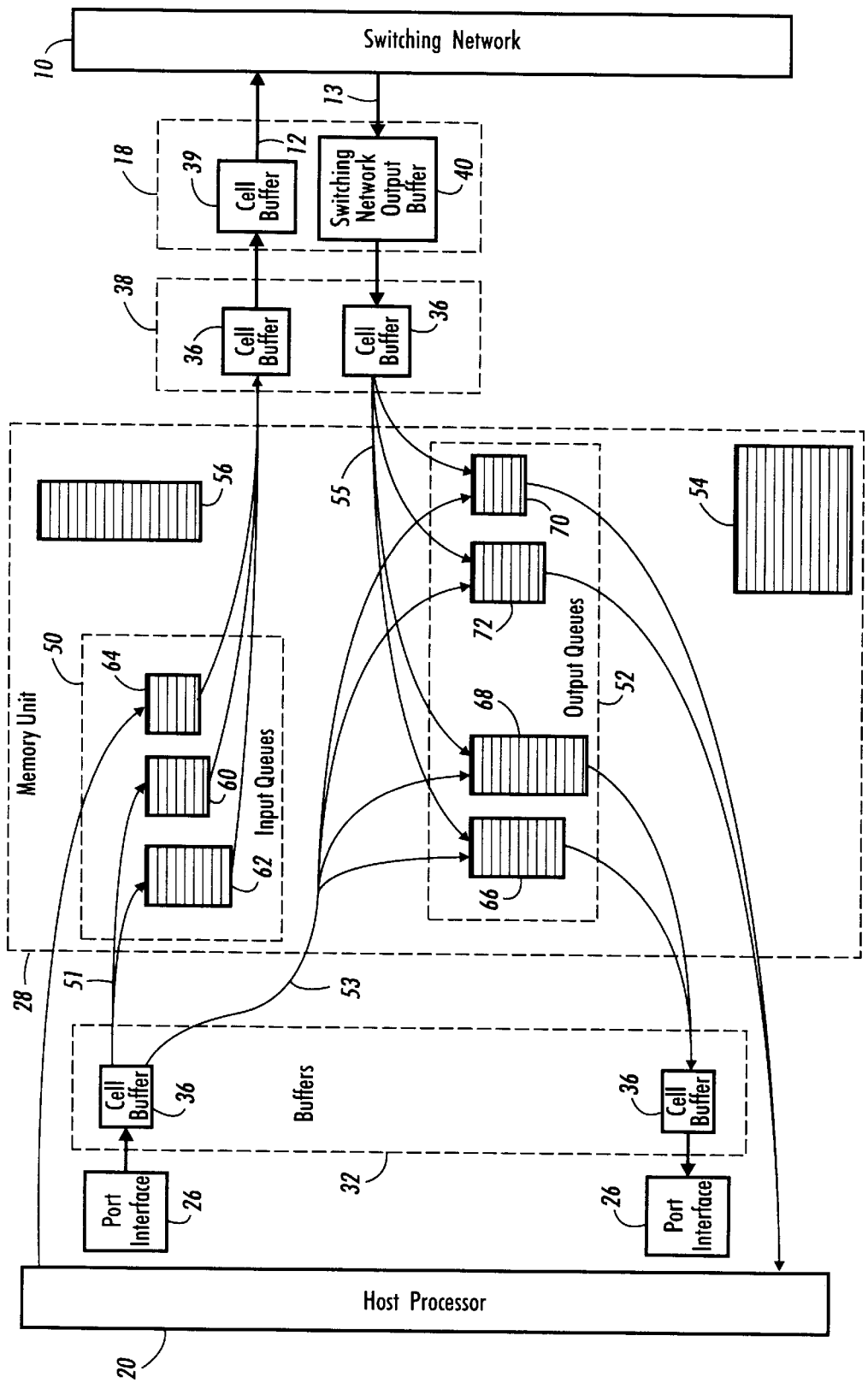
FIG. 3 schematically illustrates data structures in a memory unit of a cluster module shown in FIG. 1.

FIG. 3 illustrates data structures that are defined in memory 28 and used for buffering cells and scheduling output through port buffers 32 to interface control unit 26. Specifically, the data structures in memory 28 include input queues 50, a plurality of output queues 52, VPI/VCI maps 54, and free cell list 56. In accordance with the hierarchical organization of each cluster module 8, cells originating from port buffers 32 are routed through shared bus 30 to either input queues 50 or output queues 52, as indicated by arrows 51 and 53 respectively. These queues insure rate matching between ports 16 and channels 12 and 13. In the case of inter-cluster switching, cells are directed to input queues 50 for routing over intercluster switching network 10. Cells routed through intercluster switching network 10 are directed to output queues 52, as indicated by arrows 55. In the case of intra-cluster switching, cells originating from buffers 32 are not routed over intercluster switching network 10, but instead are directed to output queues 52 before being routed to ports 16.

The data structures shown in FIG. 3 are configured to organize cells into FIFO (first in first out) queues. The number of FIFO queues defined in memory 28 of a particular switch 5 depends on cell flow priority policies that dictate how cells are managed. In one instance, FIFO queues are created one per virtual circuit and then scheduled according to a packet scheduling algorithm such as virtual clock or weighted fair queuing. Alternatively, as shown in FIG. 3, FIFO queues can be organized according to traffic priority. In FIG. 3, input queues or buffers 50 include input queue 60 which handles high priority reserved or rate-guaranteed traffic, and input queue 62 which handles lower priority unreserved traffic. The input queues 50 can be implemented using circular linked lists that are allocated by the host processor 20. Since the head and tail pointers of the linked lists are shared between virtual circuits (VCs) and cannot be stored in the VCI Map 54, the status of the queue pointers are stored in registers 44 (shown in FIG. 2). The output queues or buffers 52, in FIG. 3, are organized as FIFO linked lists whose elements are dynamically allocated as needed from free cell list 56. Output queues 52 include output queue 66 which handles high priority reserved traffic, and output queue 68 which handles lower priority unreserved traffic. Cells from host processor 20 are routed to a single input queue 64 since the host processor 20 does not enqueue cells rapidly. Cells to be output to host processor 20 are stored either in output queue 70 or output queue 72. Higher priority reserved traffic is stored in output queue 70 while lower priority unreserved traffic is stored in output queue 72.

Cells stored in input queues 50 are scheduled for routing through intercluster switching network 10 by reservation ring 14. In contrast, cells stored in output queues 52 are output to port 16 or host processor 20 according to their priority in the output queues 52. Cells in the higher priority output queues 66 and 70 are given priority over cells in output queues 68 and 72. In the instance in which an output queue is created per virtual circuit, a scheduling mechanism is used to decide which output queue to select a cell for output from, the details of which are discussed below. An example of two scheduling mechanisms for servicing output queues which are created per virtual circuit are a calendar queue and a schedule wheel. Schedule wheels are described in detail in U.S. Provisional Patent Application entitled "Rate Shaping in Per-Flow Output Queued Routing Mechanisms Having Output Links Servicing Multiple Physical Layers," Ser. No. 60/020,642, the disclosure of which is incorporated herein by reference.

Figure 4:
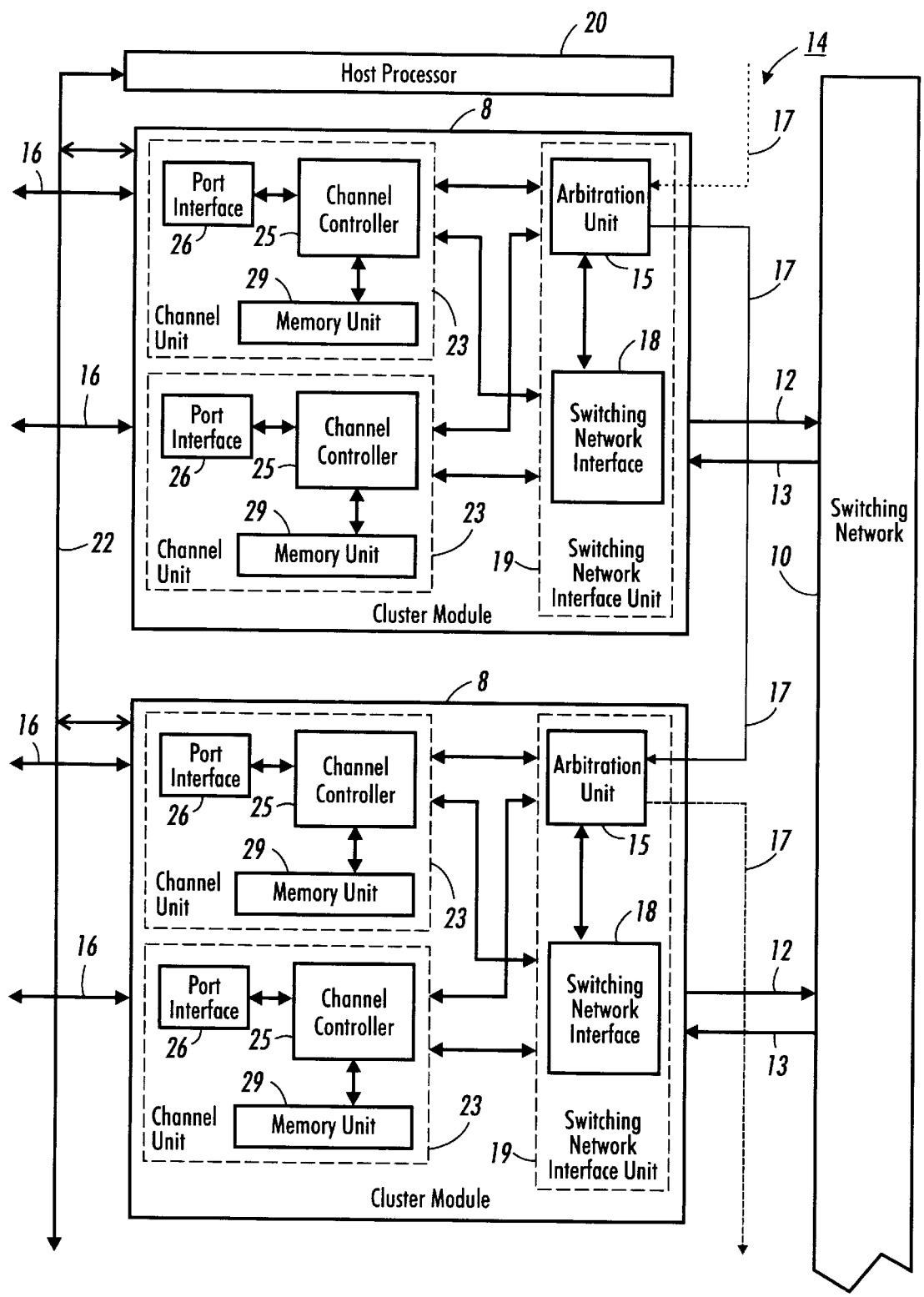
FIG. 4 schematically illustrates an alternate embodiment of the modular hierarchical ATM switch shown in FIG. 1.

FIG. 4 illustrates an alternate embodiment of the switch architecture shown in FIG. 1. In the embodiment shown in FIG. 4, channel units 23 replace the cluster controllers 24 and the cluster memory units 28 shown in FIG. 1. Each channel unit 23 includes a port interface 26, a channel controller 25, and a channel memory unit 29. Cells routed from the switching network via outgoing channels 13 are copied to each channel unit 23. Consequently, each channel unit 23 must determine whether a cell from switching network interface 19 is destined to its port 16.

It will be appreciated by those skilled in the art that in either the embodiment show in FIG. 1 or the embodiment shown in FIG. 4, the switch architectures are not limited to having a single arbitration unit 15, a single input channel 12, or a single output channel 13 per cluster module but instead can be configured to have two or more arbitration units 15, input channels 12, and output channels 13. It will also be appreciated by those skilled in the art that the number of input channels and output channels, and the number of input ports and output ports coupled to each cluster module does not have to be constant but can vary in number between cluster modules of the switch 5.

B. Output Port Clustering for Speedup Consolidation

U.S. Pat. No. 5,327,420 to Lyles, describes a reservation ring which reduces output port contention by ensuring that up to "k" cells are presented to a switching fabric for distribution to any one output port (e.g. output port 16) during a single switch cycle, where k is an integer greater than one. It has been found that distributing more than one (i.e., k>1) cell to an output port per switch cycle reduces input queue blocking. Consequently, it is advantageous for a switching network to distribute as many cells to an output port as possible during any one switch cycle. However, as "k" is increased for a switch, costs for the switch tend to increase significantly since increasing "k" in the switching network typically involves either using higher speed circuits or duplicating parts of switching networks "k" times. For example, the batcher sorting network requires "k" banyan routing switches in the batcher/banyan switching fabric disclosed in U.S. Pat. No. 5,327,420.

Even though each output port in the switch described in U.S. Pat. No. 5,327,420 ('420) has a speed up factor of "k" that is greater than one, on average (i.e., over a period of time in which there exists a sustainable throughput of cells through the switch) the switch in '420 must have no more than one cell per cell time arriving in the output buffer for each port. If this were not true, then the output buffer would eventually overflow since cells would be inserted into the output buffer faster than they would be output from the buffer. This means that, the switch in '420 operates so that the effective utilization factor of the switching network 10 of any output buffer is equal to one on average. This implies that any speedup factor of "k" greater than one goes unused over time when data packet traffic has an acceptable traffic profile (e.g., when the traffic is conforming as defined by ITu-T Recommendation I.371).

Figure 5:
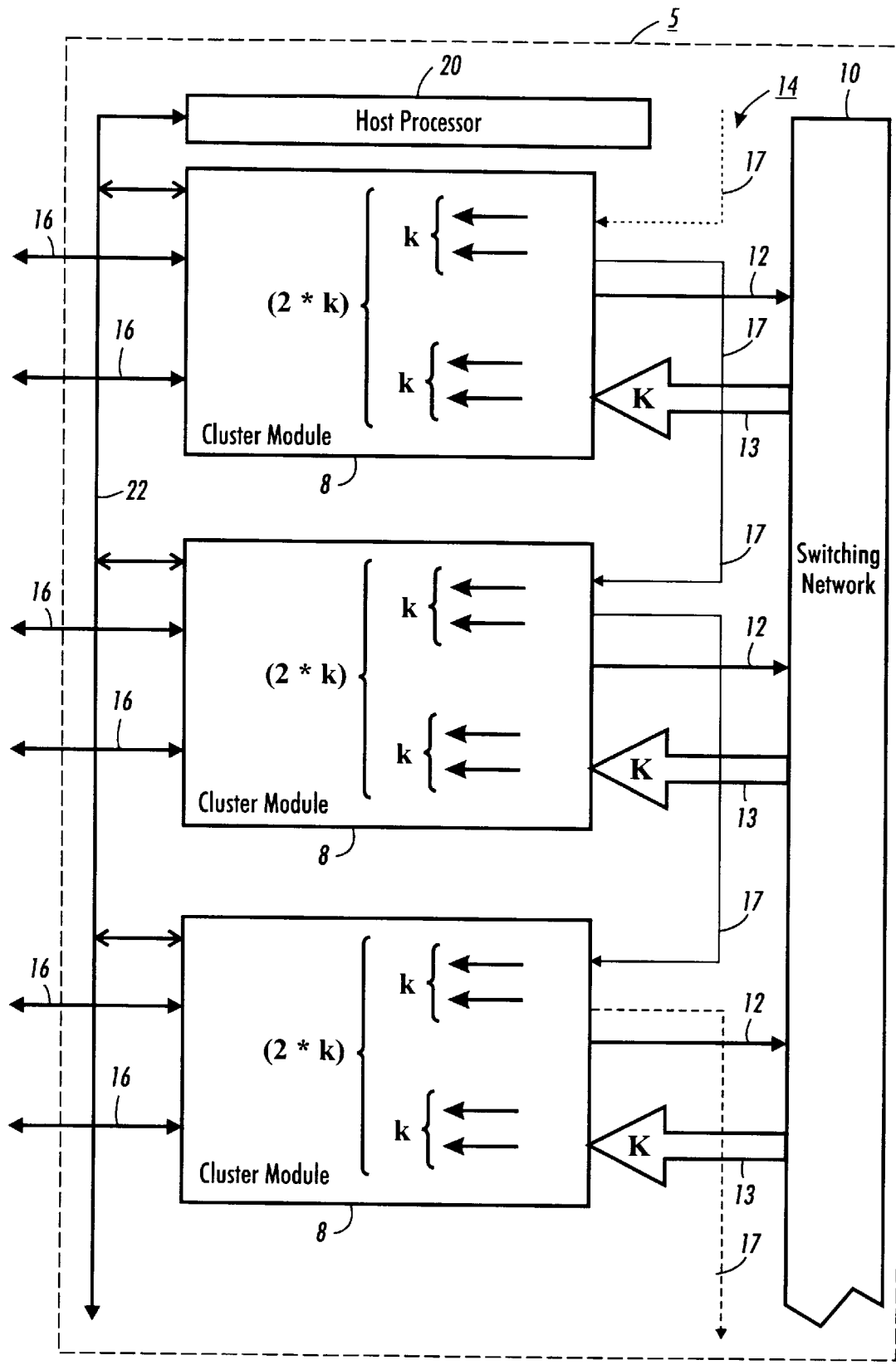
FIG. 5 schematically illustrates multi-port clusters with speedup consolidation.

FIG. 5 schematically illustrates how cluster modules 8 can be used to reduce output port contention while increasing the effective "k" speedup of each output port 16. In operation, the reservation ring 14 schedules up to "K" (upper case) (where K≧1) cells for distribution to any one output channel 13 through the intercluster switching network 10 during a switch cycle. As described above, a speedup factor of "k" reduces output port contention caused by head of queue blocking. However, unlike the speedup factor "k" (lower case) described in U.S. Pat. No. 5,327,420, the speedup factor "K" (upper case) is shared among output ports 16 of a cluster module 8. Sharing the speedup factor of "K" with each port of a cluster module 8 has the advantageous result of increasing the effective "k" (lower case) speedup per output port 16 without comparable increases in cost.

In essence, "K" (upper case) is a speed up factor per cluster module 8 that equals (p * k) where "p" is the number of ports 16 per cluster module 8, and "k" (lower case) is a speed up factor per port 16 in a switch without clustering. This speedup factor of "K" (upper case) per output channel 13 is shared among output ports 16 within a single cluster module 8. Thus, clustering can be used to increase the peak speedup per port from "k" to "K". In other words, by limiting the number of cells directed to an output channel 13 of a cluster module 8 to "K" during a switch cycle rather than limiting the number of cells directed to a single output port 16 to "k" (lower case), the effective "k" for each output port of a cluster module can be increased.

In addition, consolidating the "k" port speed up factors into a "K" speed up factor per cluster module advantageously increases the average throughput of the switch 5 during a switch cycle. Average throughput is increased by increasing the effective "k" speed up per output port 16. An additional advantage of sharing the speedup factor "K" between ports of a cluster module, is that less of the aggregated speedup factor "K" of the cluster module goes unused over time. To this end, consolidating and sharing bandwidth needed to support single port 16 into the bandwidth needed to support an associated cluster module 8 ensures that otherwise idle bandwidth of an inactive port of a cluster module can be utilized by an active port of the cluster module during a switch cycle.

For example, the switch 5 shown in FIG. 5 increases the peak bandwidth for each of the six ("P"=6) output ports 16 by switching up to four (K=4) cells per cluster module 8 through intercluster switching network 10 during a switch cycle. More specifically in FIG. 5, two ("p"=2) output ports 16 are coupled to each of the three ("M"=3) cluster modules 8 thereby sharing the intercluster switching network's capacity for delivering up to four (K=4) data packets to each cluster module every switch cycle. Thus, depending on the number of cells directed to a particular output port 16 during a switch cycle, the intercluster switching network 10 can deliver a maximum of four (K=4) (upper case) cells to a single output port 16 of a cluster module 8 each switch cycle. Accordingly, the peak "k" (lower case) per port 16 of a cluster module 8 (e.g. K (upper case)) is larger than the average peak "k" of the ports 16 of the cluster module 8 (e.g., "k"=K/p=2).

It will be appreciated by those skilled in the art that "K" for a cluster module can be defined so that the number of cells delivered to an output port 16 is less than one on average per switch cycle. For example, the switch 5 in FIG. 5 could operate with a speedup equal to one (K=1). This would mean that each of the two (p=2) output ports 16 of a cluster module would share the intercluster switching network's capacity for delivering up to one (K=1) data packet per switch cycle. Defining output channels that cannot deliver a cell to every port of the cluster module during one switch cycle provides the effect of using part or all of a switch as a consolidator instead of using the cluster module for sharing increased bandwidth "K" between ports.

B.1 Speedup Consolidation for Bus-Based Switching Networks

Figure 6:
FIG. 6 schematically illustrates an example of speedup consolidation using a bus-based network.

FIG. 6 illustrates a manner of performing speedup consolidation on a bus-based switching network. More specifically, FIG. 6 illustrates several switch cycles of a bus based switching network that is represented using frames. In FIG. 6, each frame(f) is divided into three time slots (e.g., one time slot per input channel 12 of the bus-based switching network). During each time slot of a frame, a cell is transmitted over the bus-based switching network. When cells are not available to fill a slot during a frame, idle cells are sent in the place of actual cells. Arbitration for access to the bus-based switching network takes place during one bus frame since the time required for an arbitration cycle may be longer than the time required to transmit a cell over the bus-based switching network. Thus, arbitration for bus slots in a subsequent bus frame (e.g., frame(f+1)) takes place during transmission of a current bus frame (e.g., frame(f)). In the event a cell is multicast, the multicast cell can be sent to each switching channel 13 over the bus-based switching network in one bus slot so long as the K speedup per output channel is not exceeded.

FIG. 6 shows one manner of representing several switch cycles of a bus-based switching network with a consolidated speedup of K per output channel. Speedup consolidation is achieved in a bus-based switching network by delivering up to K cells to an output channel 13 during a switch cycle. In a bus-based switching network having a switch cycle equivalent to a frame "f" shown in FIG. 6, the value of "K" for the bus-based switching network is defined by the number of data packets that each output channel 13 can receive during each frame time. In the example shown in FIG. 6, each of three output channels $Out_1$, $Out_2$, and $Out_3$ may receive up to two (K=2) data packets or cells each bus frame from different ones of three input channels $In_1$, $In_2$, and $In_3$. The switching bandwidth can be allocated in a number of ways. For example, one slot can be allocated in a round robin fashion to each of the input channels. Once bandwidth is reserved in a frame "f", as discussed in detail below, cell data $C_{i,j}$ is output onto the bus-based switching network from input channel "i" for transmission to one or more output channels "j" of the bus-based switching network. The number of destination output channels to which the input channels transmit is limited so that the speedup factor of K per output channel is not violated. In the example shown in FIG. 6, during frame(f) cell data is transmitted from input channel $In_1$ to output channel $Out_2$ (e.g., $C_{1,2}$) in slot zero, cell data is transmitted from input channel $In_2$ to output channels $Out_1$ and $Out_3$ (e.g., $C_{2,1,3}$) during slot one, and cell data is transmitted from input channel $In_3$ to output channel $Out_2$ (e.g., $C_{3,2}$) during slot two. In this example speedup consolidation is maintained because no more than K=2 cells are transmitted to each of the three output channels each frame time.

To accommodate speedup consolidation when switch 5 is configured with a bus-based switching network, the capacity of the buffer 40 of cluster module 8 (shown in FIG. 3) must be large enough to accommodate a burst of "K" cells during a switch cycle from output channel 13. For example, in a switch with a speedup of K=4 cells, the buffer 40 must have a storage capacity of approximately eight cells in the event a cluster module 8 receives four cells during two consecutive switch cycles. This storage capacity is sufficient to buffer up to two back-to-back burst of K=4 cells. In other words, the buffer 40 can be filled over a switch cycle with 2*K cells by receiving K cells at the end of one switch cycle and K cells at the beginning of the next switch cycle. The actual required storage capacity of buffer 40, however, may be somewhat less than the size of eight cells since the buffer 40 is simultaneously emptied and filled.

B.2 Speedup Consolidation for Fabric-Based Switching Networks

Figure 7:
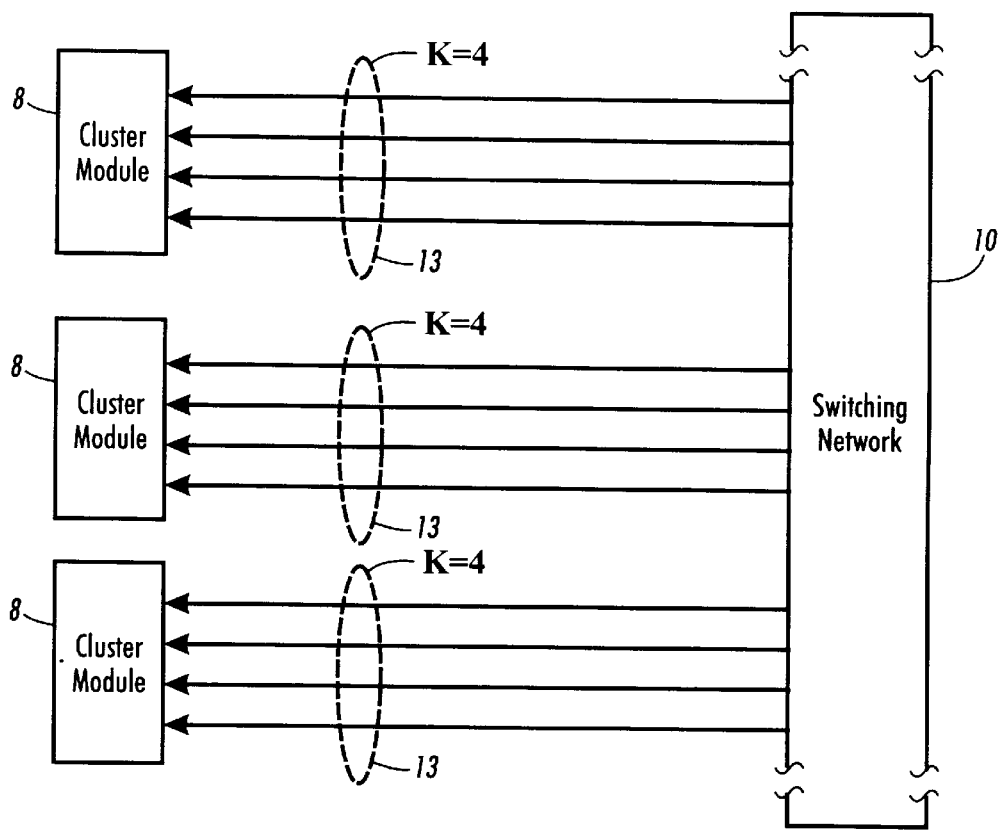
FIG. 7 schematically illustrates an example of speedup consolidation using parallel routing networks, such as a multi-plane crossbar or banyan routing network.

FIG. 7 illustrates an example of speedup consolidation using fabric-based routing networks (i.e., parallel networks). In FIG. 7, the intercluster switching network 10 is composed of "K" (upper case) fabric-based routing networks (i.e., "K" parallel routing planes). An example of a fabric-based routing network is a banyan routing network, which is described in U.S. Pat. No. 5,327,420, the disclosure of which is incorporated herein by reference. More specifically, FIG. 7 illustrates a fabric-based routing network in which each output channel 13 has four parallel sub-channels. Each sub-channel is connected to a different routing plane (e.g., a distinct banyan routing network). Unlike the bus-based switching network described in FIG. 6 which time multiplexes the delivery of cells to output channel destinations, the fabric-based routing network space multiplexes up to four (e.g. K=4) cells to each output channel 13 each switch cycle.

B.3 Dynamic Allocation of Speedup Consolidation

Because the speed-up "k" (lower case) is no longer fixed per output port 16, the peak "k" for a port 16 can be dynamically allocated. In this embodiment, the switch 5 dynamically divides the speed-up of "K" per cluster module among associated cluster module output ports 16. More specifically, in this embodiment a maximum speed-up of "k_alloc" cells is defined for each output port 16 such that the sum of the speedup (k_alloc) for each output port within a cluster module 8 is less than or equal to K. That is "k_alloc" represents a peak number of cells that can be received by an associated output port 16 of a cluster module 8 during a switch cycle. In addition, this defined maximum speed-up of k_alloc cells per output port can be dynamically adjusted in response to expected traffic patterns so that $0 \leq k\_alloc \leq K$. In effect, the speed-up k_alloc per output port 16 defines a maximum peak "k" for an output port 16 of a cluster module 8.

Dynamically allocating the speed-up of "K" per cluster module among its output ports advantageously provides a method for altering the effective "k" for each port 16 of a cluster module 8 to account for varying traffic conditions. In other words, the switch 5 defines and dynamically regulates a unique "k_alloc" for each port of a cluster module as cell data traffic changes over time. More specifically, dynamically regulating the peak speed up "k" (i.e. "k_alloc") of each port 16 provides a mechanism for allocating switching among output ports to insure that no single port 16 persistently blocks other ports 16 from routing cells over intercluster switching network 10. In one embodiment, software running on control processor 20 sets a maximum k_alloc speed up per output port at switch initialization or in response to changing traffic patterns. Also, it will be appreciated by those skilled in the art that switch 5 can be configured to dynamically adjust values for "K" of each cluster module. For example, a bus based switching network can be configured with a maximum speedup of K defined for each cluster module that can vary in a similar manner as the maximum speedup of k defined per port.

C. Limited Bandwidth Switching Networks

Figure 8:
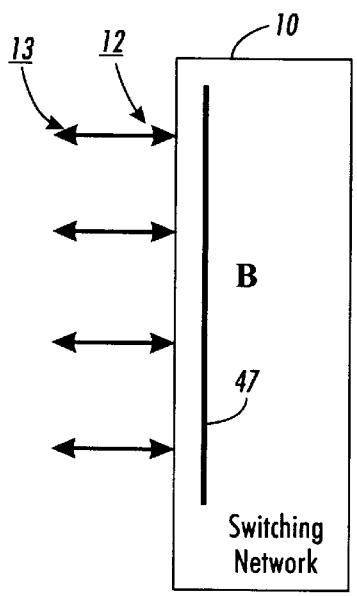
FIG. 8 schematically illustrates an example of a bus-based switching network that is blocking.
Figure 9:
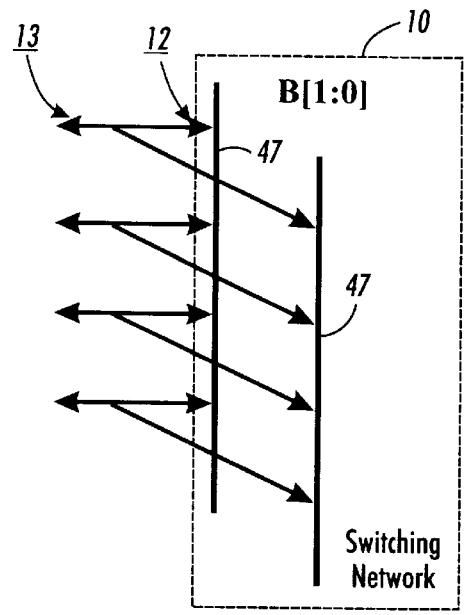
FIG. 9 schematically illustrates an example of a dual bus-based switching network that is blocking.
Figure 10:
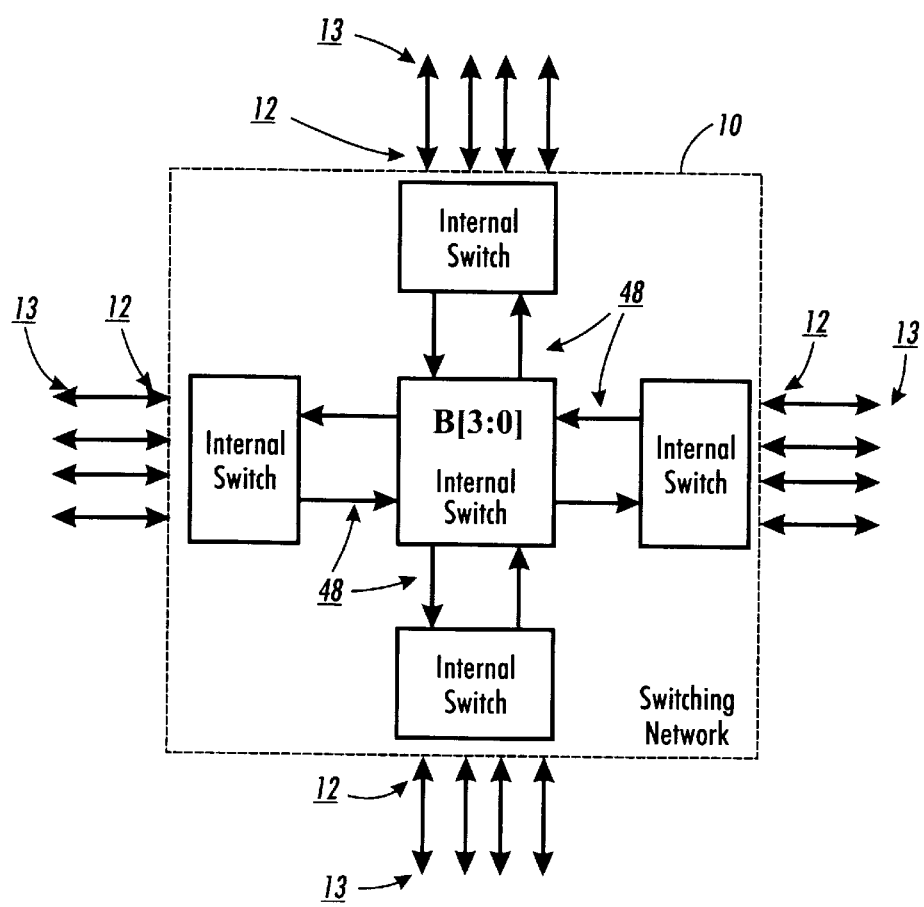
FIG. 10 schematically illustrates an example of a fabric-based switching network that is blocking.

FIGS. 8, 9, and 10 illustrate three examples of limited bandwidth switching networks. The switching network 10 of switch 5 is defined herein to be a limited bandwidth switching network. By definition, the limited bandwidth switching network 10 has a set of output ports (or channels) to which the switching network can only transmit a limited number of cells per switching cycle. Consequently, the switch is unable to generate all possible one-to-one input channel 12 to output channel 13 mappings each switch cycle. In addition, a switch with a limited bandwidth switching network may be blocking during a switch cycle. In many situations, a limited bandwidth switching network operates with a bandwidth that is less than the aggregate rate at which the switch 5 can receive cells. In this case, the switching network may block during a switch cycle since the switch is unable to operate at a bandwidth that is equal to the aggregate bandwidth of the ports 16.

The advantage of restricting the bandwidth of the intercluster switching network 10 to "B", is that the overall cost of switch 5 is reduced. Generally, the bandwidth of a switching network can be limited when it is known that some number of ports 16 of the switch will not receive cells at the maximum allowable link rate. Limiting switching network bandwidth, however, will typically increase contention for the switching network. In the event the limited switching network bandwidth "B" is exceeded during a switch cycle, input buffers 50 (shown in FIG. 3) provide temporary buffering at each cluster module 8 to avoid dropping cells when the momentary sum of the link rates of ports 16 is greater than the bandwidth at which the switching network 10 can operate.

FIG. 8 illustrates an example of a limited bandwidth switching network 10 that has one bus 47 coupled to four input channels 12 and four output channels 13. The bus-based switching network operates with limited bandwidth "B" which is less than the aggregate rate at which input channels 12 can receive cells. The bus-based switching network 47 operates with a limited bandwidth "B" when the bus transmits fewer than four cells over the bus during a switch cycle. For example, when each switch cycle of the bus 47 shown in FIG. 8 has three time slots, the bus 47 may be blocking because it is unable to generate all possible one-to-one input channel 12 to output channel 13 mappings during a switch cycle. That is, only three of four input channels are capable of transmitting cell data to the output channels 13 during a switch cycle even though each input channel 12 may receive a cell each switch cycle.

FIG. 9 illustrates another example of a limited bandwidth switching network 10 that has two busses 47 that are coupled to four input channels 12 and four output channels 13. The limited bandwidth switching network 10 shown in FIG. 9 operates at a bandwidth "B" that is defined by the bandwidth at which the combination of the buses 47 operate. Bandwidth "B" for the switching network of FIG. 9 can therefore be represented by summing "$B_1$" and "$B_2$", where each "$B_n$" represents the number of bus slots per switch cycle on a given bus "n". Unlike the limited bandwidth switching network shown in FIG. 9, input channel to output channel mappings can be made using either of the two busses. Consequently, the switching network 10 shown in FIG. 9 has a limited bandwidth when the combination of slots for both buses is unable to generate all possible one-to-one input channel 12 to output channel 13 mappings each switch cycle. For example, the switching network 10 shown in FIG. 9 has limited bandwidth if one of the two buses has one slot per switch cycle and the other of the two buses has two slots per switch cycle. It will be understood by those skilled in art that this is an example of time and space division multiplexing. Thus, the limited switching network 10 shown in FIG. 9 can be limited by either time or space, or a combination of both time and space.

FIG. 10 illustrates yet another limited bandwidth switching network 10 which has four internal switching connections 48 that have limited bandwidth. The switching network 10 shown in FIG. 10 is an example of a cross-point network with a limited number of transmission connections that each operate at a bandwidth "$B_n$". The limited bandwidth "B" of the switching network 10 is defined by the set of transmission connection bandwidths "$B_n$". For example, switching network 10 can be defined by the set of "$B_1$", "$B_2$", "$B_3$", and "$B_4$" where "$B_n$" is the allowable number of cells that can be routed through a given transmission connection "n" during each switch cycle. As with the switching network shown in FIGS. 8 and 9, the switching network 10 shown in FIG. 10 is a limited bandwidth switching network because the set switching connections 48 is unable to provide any one-to-one input channel 12 to output channel 13 mappings in a switch cycle.

D. Reservation Ring for Arbitrating Access to Multiple Network Resources

Figure 11:
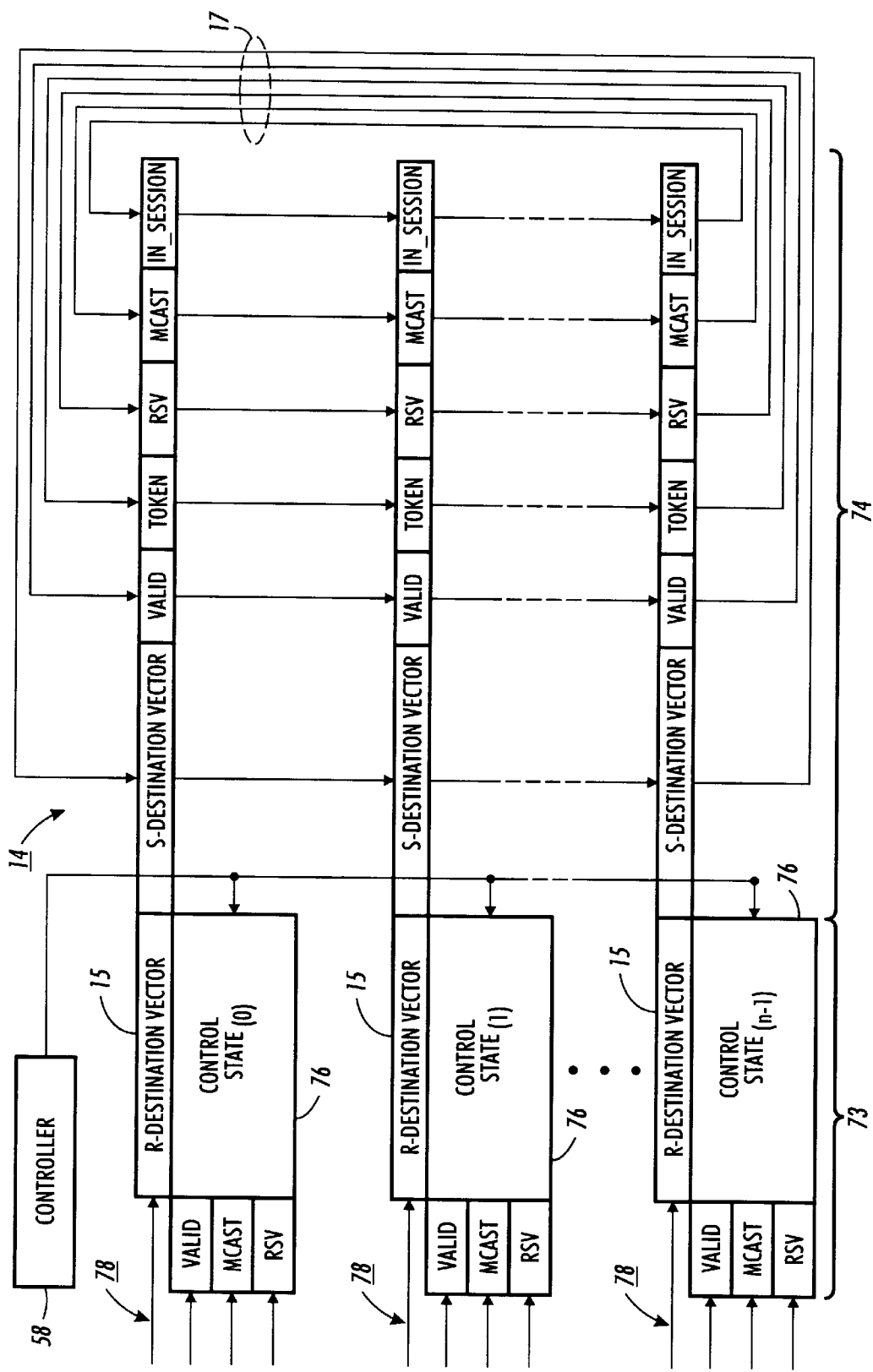
FIG. 11 schematically illustrates a reservation ring operating in the modular hierarchical switch shown in FIG. 1.

FIG. 11 illustrates a reservation ring 14 that provides distributed arbitration of shared network resources, which include switching network bandwidth, and access to output channels 13 and output ports 16. The reservation ring 14 is made up of a plurality of arbitration units 15 that resolve contention for network resources during an arbitration cycle. For example, the reservation ring 14 resolves contention for the output channels 13 of intercluster switching network 10 (denoted herein as "K" contention) and the contention for limited switching network bandwidth (denoted herein as "B" contention). At the start of an arbitration cycle, arbitration requests for access to an output channel(s) are submitted to arbitration units 15. The arbitration requests are shifted around the ring 14 over a set of lines 17 using a central clocking mechanism, such as controller 58. In an alternate embodiment that requires a fewer number of pins of integrated circuits, arbitration request signals are time multiplexed (or pipelined) around the ring using a smaller set of lines 17.

Arbitration units 15 arbitrate during an arbitration cycle for access to network resources which include output ports 16, output channels 13, and bandwidth of switching network 10. As arbitration requests submitted to arbitration units 15 are shifted around the reservation ring 14 during an arbitration cycle, each arbitration unit compares incoming arbitration requests with its resident arbitration request (i.e., its own arbitration request being shifted around the reservation ring). This comparison is made by each arbitration unit at each stage of arbitration during an arbitration cycle. If an arbitration unit identifies a network resource conflict, the arbitration unit determines which arbitration request (i.e., the shifted request or the resident request) has a higher priority for the network resource. Because there are a plurality of network resources, arbitration for access to the network resources may require multiple arbitration rounds (i.e., an arbitration request is shifted around the reservation ring once during an arbitration round) to complete an arbitration cycle. Whether one or more arbitration rounds is required to complete an arbitration cycle depends on the relationship between the network resources during arbitration (i.e., whether arbitration for one network resource is inter-dependent or independent on the arbitration of another resource).

Arbitration for multiple network resources may be performed in parallel during a single arbitration round whenever arbitration for each of the network resources is performed independently from the other network resources. For example, if the peak number of cells that each output port 16 of a cluster module 8 can receive (i.e., k_alloc) sum to no more than the number of cells a cluster module 8 can receive (K) (i.e., the sum of the k_allocs is equal to K), then arbitration for access to output ports 16 and output channels 13 is independent. Consequently in this example, arbitration can be performed in parallel during a single arbitration round (i.e., a single pass around the reservation ring 14). Switching network access in this instance is granted whenever an arbitration unit wins arbitration for both the requested output port(s) and output channel(s).

Arbitration requests for multiple network resources, however, are not performed independently when the number of cells that each output port of a cluster module can receive sum to more than the number of cells a cluster module can receive (i.e., the sum of the k_allocs is greater than K). Performing inter-dependent arbitration for these network resources results in greater utilization of the network resources. For example, greater utilization of network resources occurs if an arbitration unit only arbitrates for access to an output channel 13 if it has won access to an output port 16. Similarly, if the switching network bandwidth is limited, greater utilization of the network resources occurs if an arbitration unit only arbitrates for switching network bandwidth if it has won access to both an output port and an output channel.

Where inter-dependent arbitration for network resources is performed, maximum switch throughput can be achieved by shifting arbitration requests around the reservation ring multiple times. During each pass around the reservation ring, an arbitration unit determines which arbitration requests have higher priority for the network resources. Arbitration units eliminate themselves from any later rounds once they lose a round of arbitration (i.e., if an arbitration unit loses in a round of arbitration, it will not submit a request during later rounds of arbitration). An example of inter-dependent arbitrating for multiple network resources is described in detail below.

D.1 Example of Inter-Dependent Arbitration for Access to Multiple Network Resources Over the Reservation Ring In this example of inter-dependent arbitration for network resources, it is assumed that access to output ports 16 and output channels 13 can be performed in parallel (i.e., the sum of the k_allocs for each port of a cluster module is no more than K) and the switching network 10 of switch 5 has limited bandwidth. Arbitration for access to output channels 13 takes place during one or more arbitration cycles. Each arbitration cycle decomposes into two rounds of arbitration. During the first round of arbitration output channel contention is settled, and during the second round of arbitration intercluster switching network bandwidth contention is settled. In addition, each arbitration cycle can take place during one or more switch cycles. For example, in the bus-based switching network shown in FIG. 6, an arbitration cycle for multiple bus slots takes place during a bus frame time. By arbitrating for more than one bus slot during a bus frame time, the time available for arbitration over the reservation ring 14 is advantageously increased.

In accordance with the teachings set forth in U.S. Pat. No. 5,519,698 to Lyles et al., the disclosure of which is incorporated herein by reference, reservation ring 14 is implemented as a linear systolic array of finite state machines or arbitration units 15, each of which only communicates with its immediate neighbor. Reservation ring 14 provides scheduling for cells requesting access to intercluster switching network 10 such that no more than "K" cells are routed to a single output channel 13 during a switch cycle and no more than "B" cells are input into the switching network during a switch cycle. The values for K assigned to each arbitration unit 15 can either be constant across all output channels or vary between output channels 13. Similarly, if there are multiple switching resources that limit the ability of the switch to route any one-to-one mappings, each value of K associated with each resource may have a common value or a value that may differ. Each cluster module 8 includes a finite state machine or arbitration unit 15 that determines whether a cell appearing at the head of input queues 50 (shown in FIG. 3) should be transmitted during a subsequent switch cycle of the intercluster switching network 10. More specifically, each arbitration unit 15 of reservation ring 14 is a finite state machine that examines the highest priority cell its associated cluster module 8 is ready to send and determines how many other cluster modules have cells of higher priority at the head of their input queues 50.

State information for each arbitration unit 15 is stored in internal registers 73. Information that is passed to each arbitration unit is stored in interface shift registers 74. Assuming the reservation ring 14 has "m" arbitration units, the state information for each arbitration unit 15 that propagates around the ring 14 once is shifted "m" times during an arbitration round. An arbitration cycle, can be composed of one or more arbitration rounds. Each of the "m" shifts in an arbitration round is defined herein as an "arbitration stage". The state information stored in each interface shift register 74 includes an "R (i.e., resident)-Destination Vector" that is stored internal to each arbitration unit 15 and contains information that indicates the desired destination output port 16 of a particular cell. In one embodiment, an array of bits is used to represent each possible output port 16 in the resident destination vectors. In the event a cell is multicast to more than one output port 16, more than one of the bits in its destination vector is set. In an alternate embodiment, pre-defined sequences of bits can be used to define a particular set of output channels 13. In this alternate embodiment, each destination vector is made up of pre-defined sequences of bits to indicate one or several output ports 16. At the start of an arbitration cycle, the "R-destination vector" of each arbitration unit 15 on the ring is copied into its "S (i.e., shift)-Destination Vector". Each of these "S-Destination Vectors" are shifted around the arbitration ring during an arbitration round.

In addition, each interface shift register 74 and internal register 73 include a "valid" bit. The "valid" bit indicates whether an arbitration request is valid for a given arbitration cycle. Also, each interface shift register 74 includes information that indicates the priority of a cell being arbitrated. Priority of cells is both intrinsic and extrinsic. Intrinsic priority is a priority that is associated with a cell (e.g., whether a cell is a multicast cell or whether a cell is reserved or unreserved traffic). Extrinsic priority is priority that is generated by the arbitration ring (e.g., the token or "T" bit). Part of this priority information of a cell is duplicated in internal registers 73. Specifically, priority is defined using a "token" bit, a "Rsv" bit, an "MCast" bit, and an "in_session" bit. These priority bits are used to determine whether an arbitration unit 15 will win or lose an arbitration round with another arbitration unit. Briefly, the "token" or "T" bit is a tie-breaking bit that indicates whether another arbitration unit has a higher priority, the "MCast" bit indicates whether a cell is multicast or unicast, the "Rsv" bit indicates whether a cell is reserved or unreserved traffic, and the "in_session" bit indicates whether a cell has been blocked during a prior arbitration cycle.

Figure 12:
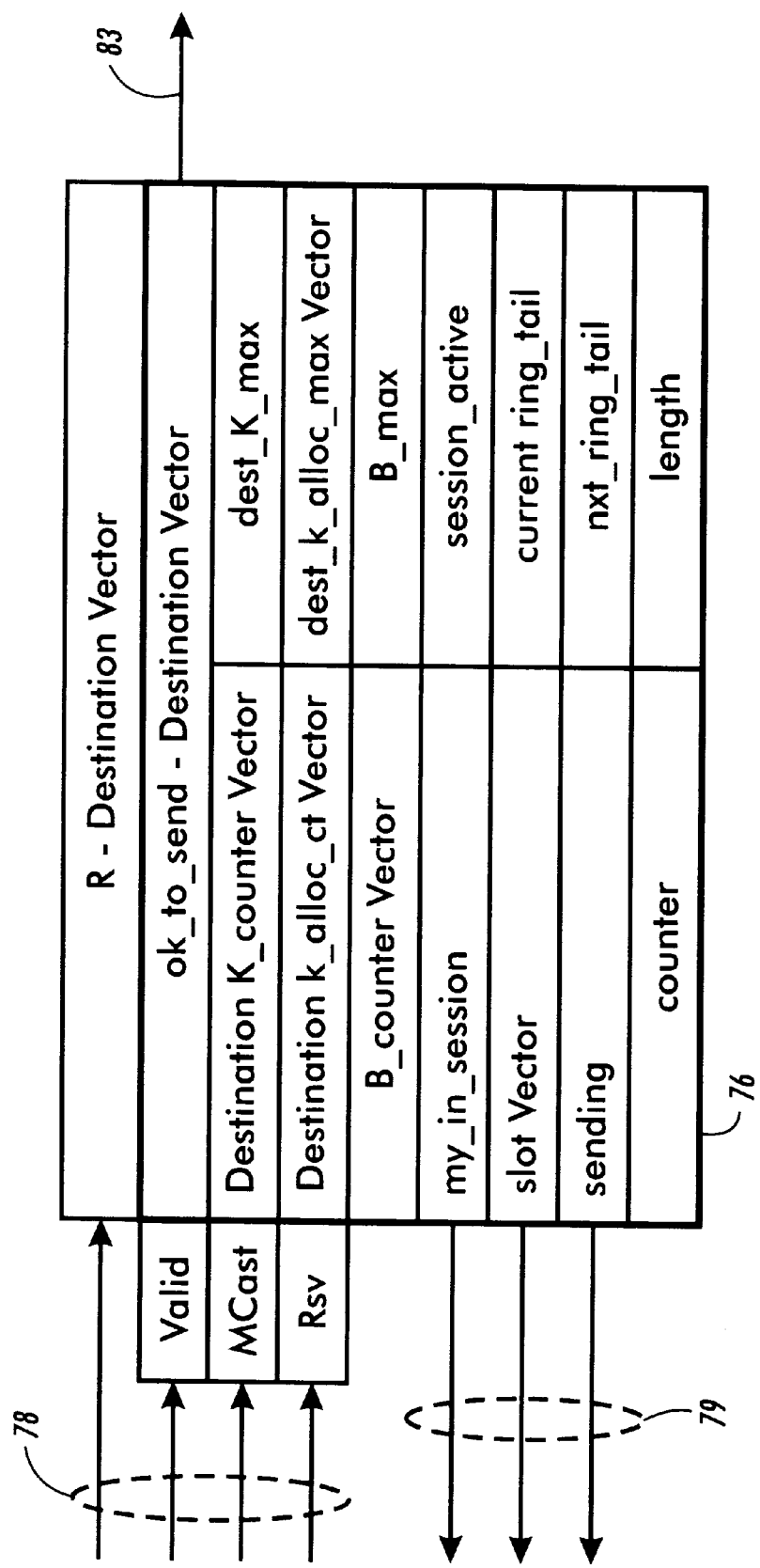
FIG. 12 schematically illustrates the control state of an arbitration unit.

FIG. 12 illustrates in detail the control state 76 of an arbitration unit 15. In operation, the control state 76 stored in each internal registers 73 is accessed by arbitration units 15 during an arbitration round. Detailed descriptions of each state variable in control state 76 is set forth in the Appendix under the "Arbitration unit State per Port" heading. In addition, the Appendix sets forth a pseudo code description that illustrates operations performed by each arbitration unit 15 during an arbitration cycle, the general steps of which are described below and set forth in FIGS. 13–16. Generally, control state 76 is used by an arbitration unit to record state information during an arbitration "session". An arbitration session may include several arbitration cycles. The length of an arbitration session depends on whether a cell successfully gains access to one or more desired output channels 13. As will be seen, cells that are destined to the same output destination during any given arbitration session form a closed set against subsequent arrivals until all of the cells that are participating in the given session have been routed to their common destination. In an alternative embodiment, these requirements may be relaxed to allow cells not part of the closed set to participate in the given session. Thus, in the alternate embodiment an arbitration request in a new arbitration session may participate so long as it does not interfere with a preexisting arbitration session. Details of an arbitration ring with relaxed session requirements is set forth in U.S. Pat. No. 5,305,311, the disclosure of which is incorporated by reference.

Figure 13:
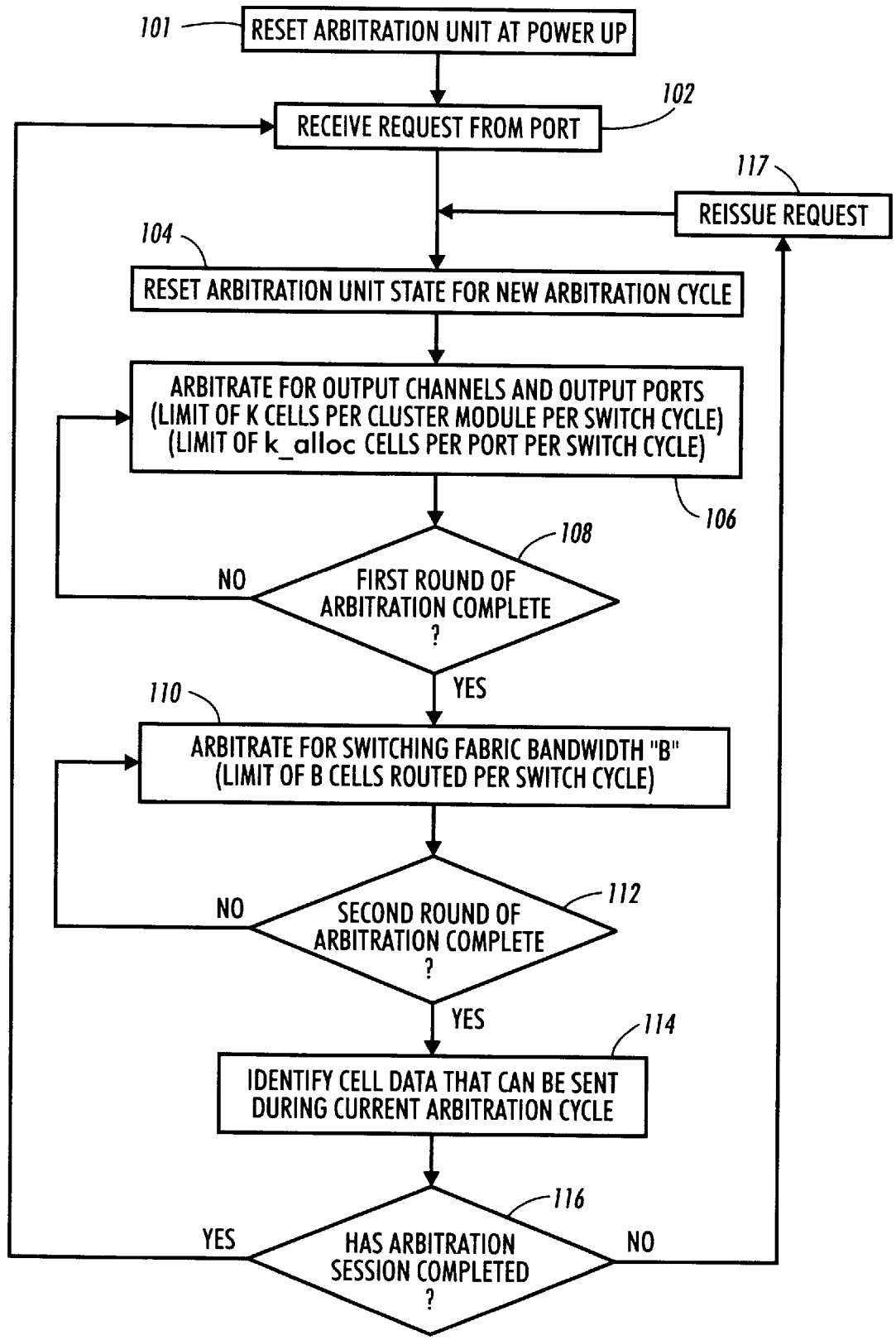
FIG. 13 illustrates a flow chart depicting the general steps performed by each arbitration unit during an arbitration session.

D.2 Method for Arbitrating Access to Limited Bandwidth Switching Networks and/or Multi-Port Clusters with Speedup Consolidation FIG. 13 is a flow chart depicting the general steps performed by each arbitration unit 15 during an arbitration session. A cluster module 8 initiates or joins an arbitration session by submitting an arbitration request to its arbitration unit 15. The arbitration request specifies where to send a data packet or cell and identifies the priority level of the data packet. For example, since a multicast cell may require access to one or more output channels 13, an arbitration session may take one or more arbitration "cycles" to satisfy the arbitration request. At the end of an arbitration cycle, the routing of cells from certain input channels 12 to certain output channels 13 of switching network 20 is defined for the next switch cycle. As set forth above, each arbitration "cycle" includes two arbitration "rounds". During each arbitration "round" an arbitration request from a cluster module (or input channel 12) propagates around the reservation ring 14. During the first arbitration round, any contention for output channels 13 between any input channels 12 is settled. And during the second round, any contention for the bandwidth "B" of the switching fabric between any input channels 12 is settled. As will be recalled, during each arbitration round, an arbitration request is shifted to each arbitration unit 15 around the ring 14, and each shift is defined as a "stage" of an arbitration round.

During an arbitration cycle, each arbitration unit 15 forming reservation ring 14 arbitrates for access to intercluster switching network 20. An "arbitration session" is associated with a destination and remains active when the arbitration session is extended into the next arbitration cycle. An arbitration session is extended whenever any arbitration unit has unsuccessfully arbitrated for access to the associated destination channel 13. In the event an arbitration session is extended, no additional request can join the session and the arbitration requests that are part of the session have priority over any arbitration requests later submitted for the destination associated with the session.

Thus, while an arbitration session is active, arbitration units can re-submit previously blocked requests or new requests, however, no arbitration unit 15 can begin a new arbitration session for the associated destination because requests that are part of the session are satisfied before any new requests win arbitration. Using an arbitration sessions to insure that cells are not indefinitely blocked is known, the details of which are disclosed in U.S. Pat. No. 5,519,698.

At step 101, state variables in each arbitration unit 15 on reservation ring 14 are reset at power up. More specifically, all variables in the internal registers 73 and interface shift registers 74 are cleared. For example, a "my_in_session" variable stored in the control state 76 is reset to "FALSE". At step 102, arbitration requests are received by arbitration units 15 over request lines 78. An arbitration request with a "Valid" bit set to TRUE indicates that the arbitration unit 15 has a cell to submit to the network for routing. At step 104, the state information in the control state 76 of each arbitration unit 15 is reset at the start of a new arbitration "cycle". The state information in the control state 76 is shown in detail in FIG. 12.

Arbitrating for access to one or more output channels 13 during an arbitration session requires that an arbitration unit 15 participate in each round of an arbitration cycle. During a first arbitration round, each arbitration unit 15 arbitrates for access to one or more output channels 13 of switching network 10 and one or more output ports 16 of cluster module 8, at step 106. Each output channel 13 of switching network 10 is limited to receiving at most "K" cells during a subsequent switch cycle, and at the same time, each output port 16 is limited to receiving at most "k_alloc" cells during the subsequent switch cycle. The method for enforcing the limit of "K" cells per output channel 13 and "k_alloc" cells per output port 8 is described in detail below. At step 108, the arbitration request for each arbitration unit is shifted to a neighboring arbitration unit and step 106 is repeated until each stage of the first round of arbitration has completed. During a second arbitration round, bandwidth of the intercluster switching network 10 is arbitrated for by each of the arbitration units 15 at step 110. The total bandwidth available on the switching network 10 is limited to "B", where "B" is less than the aggregate link rate of the ports 16. Step 110 is repeated for each arbitration unit 15 on reservation ring 14 at step 112, until each stage of the second round of arbitration has completed.

At step 114, each arbitration unit determines whether arbitration for switching network bandwidth was successful for any requested output channels 13. Arbitration is successful when a cell is granted a reservation to be switched during the next switch cycle of the switching network 10. At step 116, if a current arbitration session has successfully completed then step 102 is repeated, otherwise step 117 is executed. At step 117, an arbitration request is either fully or partially reissued. An arbitration request is partially reissued when access to part of a set of requested output channels has been granted for a subsequent switch cycle of the switching network 10. Arbitration requests that are either fully or partially granted are output from grant lines 79 and 83 to cluster channel control unit 24 or switching network interface 18, respectively. Partial grants are more fully discussed hereinbelow in connection with arbitration for multicast cells. Thus, whenever part or all of an arbitration request is granted, the cell pending in buffer 33 (shown in FIG. 2) is shifted to buffer 39 for routing through intercluster switching network 10.

D.3 Arbitrating Access for to a Switching Network with Limited Bandwidth

Figure 14:
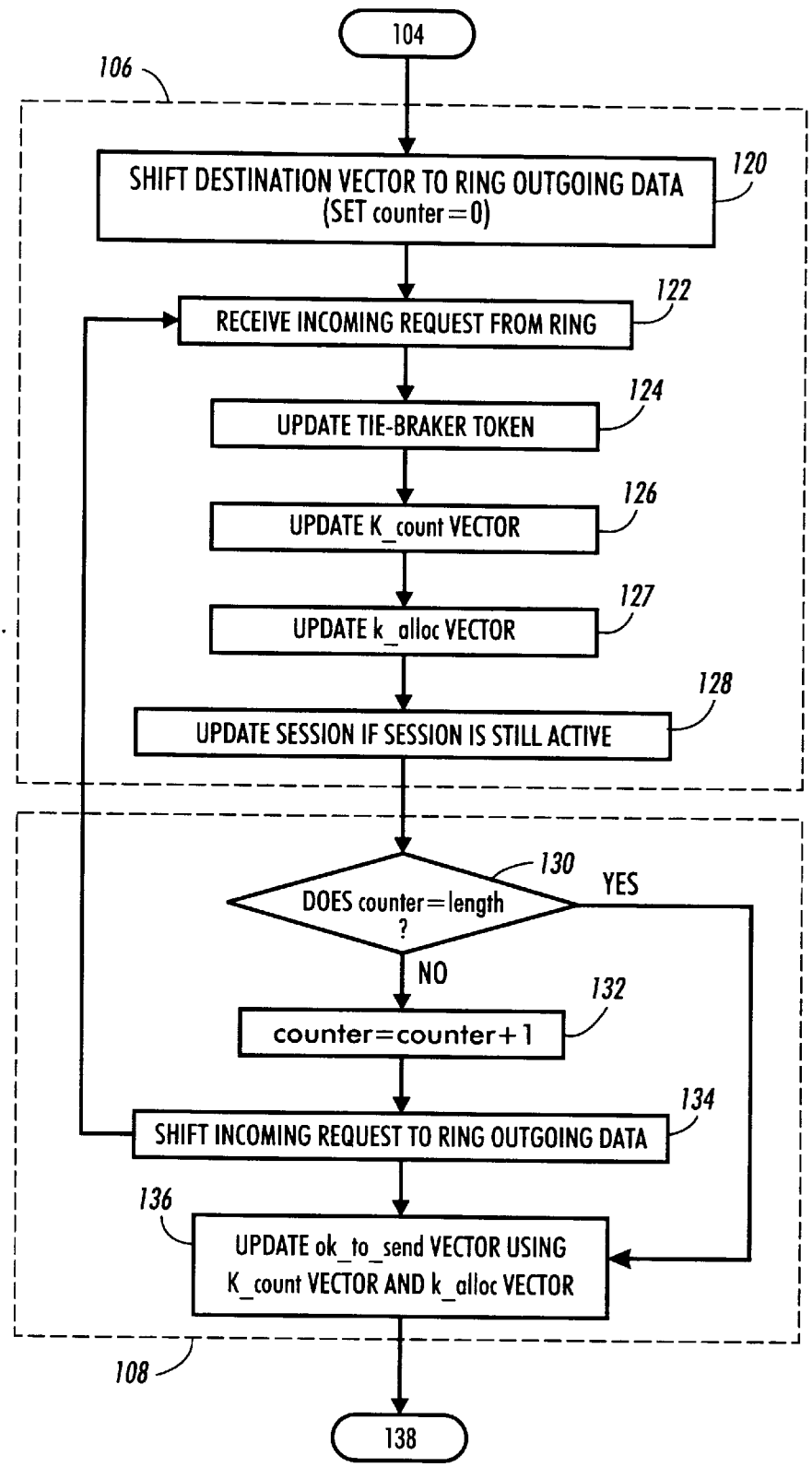
FIG. 14 illustrates a flow chart detailing steps 106 and 108 shown in FIG. 13 that relate to arbitrating for output channels and output ports.

FIG. 14 illustrates a flow chart detailing steps 106 and 108 shown in FIG. 13 that concern arbitration for one or more output channels 13 of switching network 10 during an arbitration stage. Initially at step 120, each arbitration unit 15 shifts its "S-Destination Vector" onto the reservation ring 14. As discussed above, each bit of an "S-Destination Vector" define which destination output channels are being arbitrated for during the arbitration cycle. In addition, at step 120, the "counter" variable is reset to zero to indicate that a first round of an arbitration cycle has begun (i.e., a first stage of reservation ring 14 has begun). At step 122, an incoming request from the reservation ring 14 is received in the interface shift register 74 (shown in FIG. 11) from a neighboring arbitration unit 15.

At step 124, the tie-breaker "token" received from an incoming arbitration request from the ring is evaluated so that priority can be assigned to an arbitration request when there is a tie between two arbitration units. A "token" or "T" bit which is shifted around the ring to break arbitration ties, is updated by each arbitration unit using a "current_ring_tail" and a "nxt_ring_tail" variable. These variables insures fair tie-breaking between arbitration units by defining a priority ranking at each stage of an arbitration round. Conceptually, the ring is broken into an ordered list of arbitration units. Arbitration units that are higher in the list are given priority over arbitration units that are lower in the list. To increase fairness, the starting arbitration unit in the list is not static but instead is rotated around the ring. This advantageously increases fairness across ports by breaking arbitration ties with rotating priorities that are not static. For example, initially each arbitration unit 15 sets its "token" variable to HIGHER (priority) before outputting an arbitration request on the ring. A designated arbitration unit is assigned to be the tail of the list at power up. The arbitration unit that is designated as the tail of the list flips the "token" variable to LOWER (priority) before outputting it onto the ring. An arbitration unit that receives a LOWER (priority) token assigns a lower priority to the shifted arbitration request than the resident arbitration request. However, when a HIGHER (priority) token is received by an arbitration unit, the shifted arbitration request is assigned a higher priority than the resident arbitration request. The next arbitration unit in the ordered list that is first to receive a LOWER token at the start of an arbitration round is the next tail of the ordered list during the next arbitration round.

At step 126, the destination "K_counter" vector is updated by each arbitration unit. This requires that each arbitration unit determine whether there is contention for requested output channels 13 of switching network 10. The number of cells delivered to an output channel 13 during a switch cycle of the switching network 10 is limited to "dest_K_max". For example, "dest_K_max" may limit the number of slots in a bus frame as described above and shown in FIG. 6. Alternatively, "dest_K_max" may limit the number of output channels of "K" routing networks as described above and shown in FIG. 7. During an arbitration stage, each arbitration unit determines whether there is contention for an output channel 13 of the switching network 10 by comparing the "resident(R)-destination vector" with the "shifted(S)-destination vector". Contention between two arbitration units for a similar output channel 13 is settled by determining which arbitration unit has priority.

More specifically at step 126, when two arbitration units are contending for the same output channel 13 during an arbitration stage, the arbitration unit with the lower priority increments its destination K_counter corresponding to that output channel in its destination K_counter vector. Priority for an arbitration request is defined using a combination of factors that include the tie-breaker "token" (T bit), the "valid" bit, the "rsv" (i.e., reserved) traffic bit, and the "mcast" (i.e., multicast) bit. The "valid" bit indicates whether an arbitration request is valid in the current arbitration round. Higher priority is given to cells with a valid bit set to TRUE. The "rsv" traffic bit indicates whether a cell is reserved or unreserved traffic. Higher priority is given to reserved traffic. The "mcast" bit indicates whether the cell is multicast or unicast. Multicast cells are given higher priority because it is more efficient to satisfy all of a cell's output channels 13 than have to re-transmit part of a multicast request on a subsequent switch cycle.

At step 127, the destination "k_alloc_ct" counter for a particular port is incremented when an arbitration unit has unsuccessfully contended with another arbitration unit for an output port 16 during an arbitration stage. The k_alloc_ct vector of each arbitration unit 15 includes one k_alloc_ct counter for each port of the switch 5. Contention between two arbitration units for an output port 16 is settled using the priorities described above for settling output channel contention. In this embodiment, the number of cells delivered to any output port of switch 5 is limited to a specified value in the dest_k_alloc_max vector. Consequently, when more than dest_k_alloc_max cells contend for a single output port, only dest_k_alloc_max cells are granted a reservation on the switching network. In an alternate embodiment in which a "k_alloc" counter is not defined for each output port 16 and only a K_count is defined for each output channel 13, each arbitration unit 15 performs step 126 and omits step 127.

At step 128, the "session_active" variable for an arbitration unit is updated. The "session_active" variable, which is stored in the control state 76 of an arbitration unit, indicates whether a previous session is still active for an output channel 13 of the switching network 10. An arbitration session is associated with a single destination output channel 13 and is completed when each of the cells participating in the session have been transmitted to the single destination output channel 13. If a session is still active for an output channel 13, then any new arbitration request for that output channel 13, which is indicated by having an in_session bit set to false, is postponed until the next arbitration session. In other words, once an arbitration session for any destination output channel 13 is started, additional request for that channel are not added to the arbitration session. Thus, when a session completes, all waiting requests for that channel at head of queues 50 which are qualified to participate in the next subsequent arbitration session are allowed to do so. By arbitrating for destination output channels 13 over a session of one or more arbitration cycles, the possibility of an input channel being indefinitely blocked is prevented.

At step 130, the "counter" variable in the control state 76 of each arbitration unit is evaluated to determine whether the arbitration request for each arbitration unit has been shifted to each arbitration unit around the ring. Once each arbitration request has been shifted around the ring, step 136 is executed; otherwise, step 132 is executed. At step 132, the "counter" variable is incremented. At step 134, the last incoming request received by an arbitration unit is shifted out onto the ring 14, and step 122 is repeated.

Step 136 is executed once content of arbitration requests of each arbitration unit has successfully shifted around the arbitration ring 14. At step 136, each arbitration unit on the ring determines whether its K_counter in its destination K_counter vector for each requested destination output channel 13 defined in the "R-destination vector", exceeds "dest_K_max". This determination is made using the "destination K_counter vector" stored in the state control logic of each arbitration unit. When the number of times an arbitration unit 15 deferred to another arbitration unit, at step 126, does not exceed dest_K_max 15, and the number of times an arbitration unit 15 deferred to another arbitration unit 15, at step 127, does not exceed dest_k_alloc_max, then the corresponding output port 16 is recorded in the "ok_to_send-destination vector". In other words, bits are set in the "ok_to_send-destination vector" only if the K_counter in the destination K_counter vector is not exceeded for a particular destination output channel 13, and the k_alloc_ct in the destination k_alloc_ct vector is not exceeded for a particular destination port 16. After the first arbitration round, each bit that is set in the "ok_to_send destination vector" indicates which destination output channels 13 may receive a data packet during the next switch cycle. These bits set in the "ok_to_send destination vector" satisfy the constraint of sending no more than "dest_K_max" cells per destination output channel 13, and no more than "k_alloc_max" cells per destination output port 16 during a switch cycle. At this point in the arbitration cycle, however, the "ok_to_send-destination vector" does not indicate whether the bandwidth limit of "B" is exceeded for the switching network 10.

In an alternate embodiment in which the speedup of K per channel and the speedup of k per port is dynamically set for each cluster module, the values defined for each dest_K_max or each dest_k_alloc_max vector must be know at each arbitration unit 15 on the reservation ring 14. That is, each arbitration unit 15 must know the maximum allowable speedup of K per channel and speedup of k per port of every arbitration unit 15 on the reservation ring 14 in order to perform steps 126, 127, and 136. As set forth above, a consistent view of the speedup of K per channel and k per port of every arbitration unit on a ring can be dynamically set at system initialization.

D.4 Arbitrating for Access to Multi-Port Clusters with Speedup Consolidation

Figure 15:
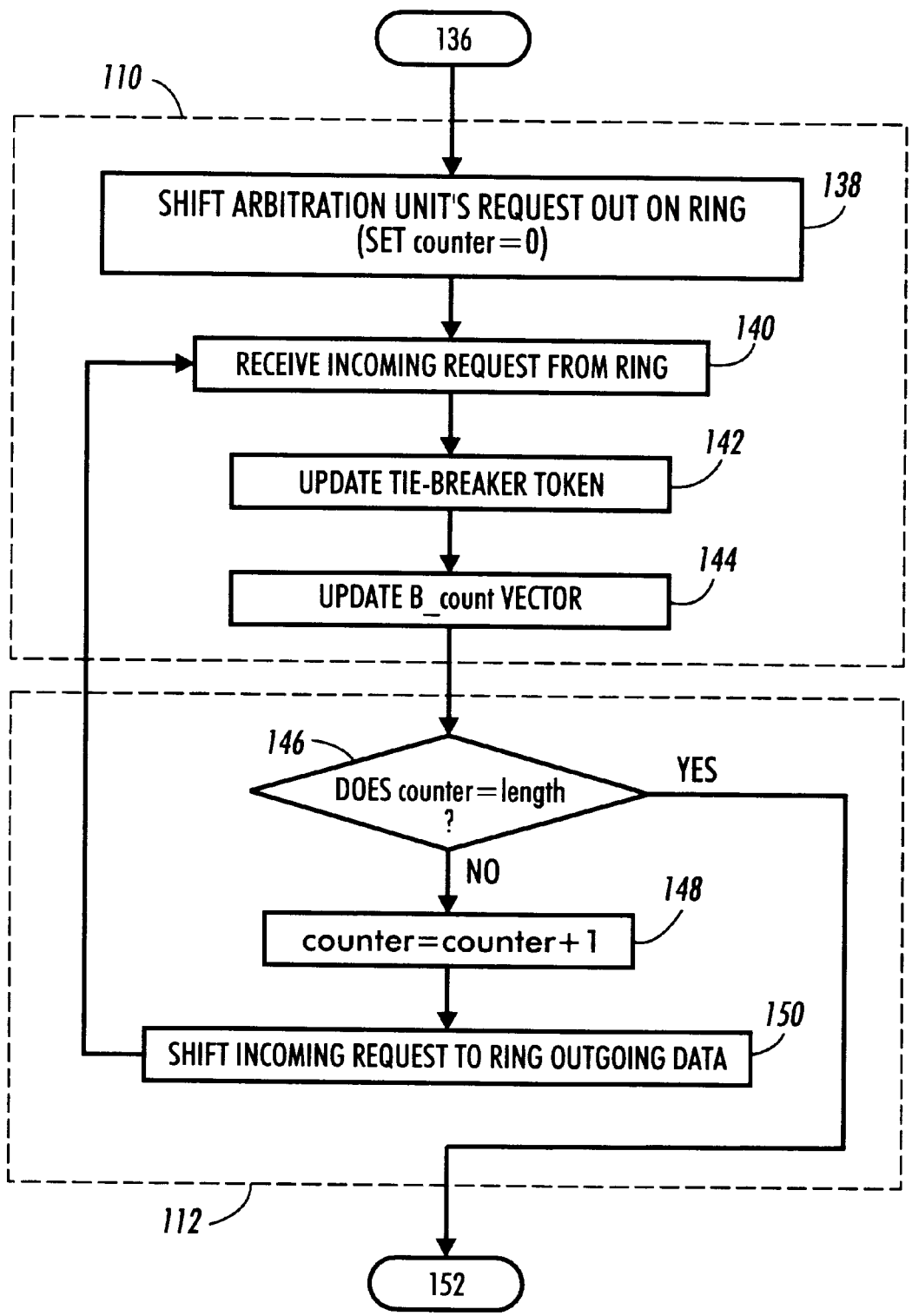
FIG. 15 illustrates a flow chart detailing steps 110 and 112 shown in FIG. 13 that relate to arbitrating for switching fabric bandwidth.

FIG. 15 illustrates a flow chart detailing steps 110 and 112 shown in FIG. 13 that concern arbitration by an arbitration unit for limited bandwidth "B" of the switching network 10 during an arbitration stage. At step 138, the counter for each arbitration unit is reset to zero to indicate that the second round of arbitration has begun. At step 138, each arbitration unit 15 with a non-zero ok_to_send destination vector shifts its request for bus bandwidth onto the ring 14. Step 138 entails shifting the arbitration request of each arbitration unit to its immediate neighboring arbitration unit. At step 140, an incoming arbitration request is received in the interface shift register 74 (shown in FIG. 11) from a neighboring arbitration unit 15. At step 142, the tie-breaker token is updated in a similar manner as performed in step 124 described above.

At step 144, each arbitration unit contends for bandwidth of the intercluster switching network 10. As described above, intercluster switching network 10 is a limited bandwidth switching network. Accordingly, the switching network 10 does not have a one-to-one mapping between its input channels 12 and its output channels 13 during a switch cycle. This bandwidth limitation is represented using the "B_max" variable recorded in the control state 76 of each arbitration unit 15. In addition, the control state 76 records a "B_count" vector with one or more B_count variables. For example, a switching network 10 similar to that shown in FIG. 8 has a single B_count variable in the B_count vector. Specifically, at step 144, the B_counter(s) in the B_count vector corresponding to the switching network(s) of the switch 5 is incremented if the priority of the shifted incoming arbitration request exceeds the priority of the resident arbitration request. This determination of priority is similar to the determination of priority made at step 126 described above.

At step 146, the "counter" is evaluated to determine whether each request for bus bandwidth "B" set forth during the current arbitration cycle has shifted around the ring to each of the arbitration units on the ring. If each interface shift register 74 has successfully shifted around the ring, step 152 is executed; otherwise, step 148 is executed. At step 148, the "counter" is incremented to indicate an additional shift of arbitration requests around the ring. Subsequently at step 134, the most recent incoming arbitration request of an arbitration unit is shifted onto the ring 14. Executing step 152 indicates that the second round of arbitration for bus bandwidth has completed.

D.5 Allocating Bandwidth Among Successful Contenders

Figure 16:
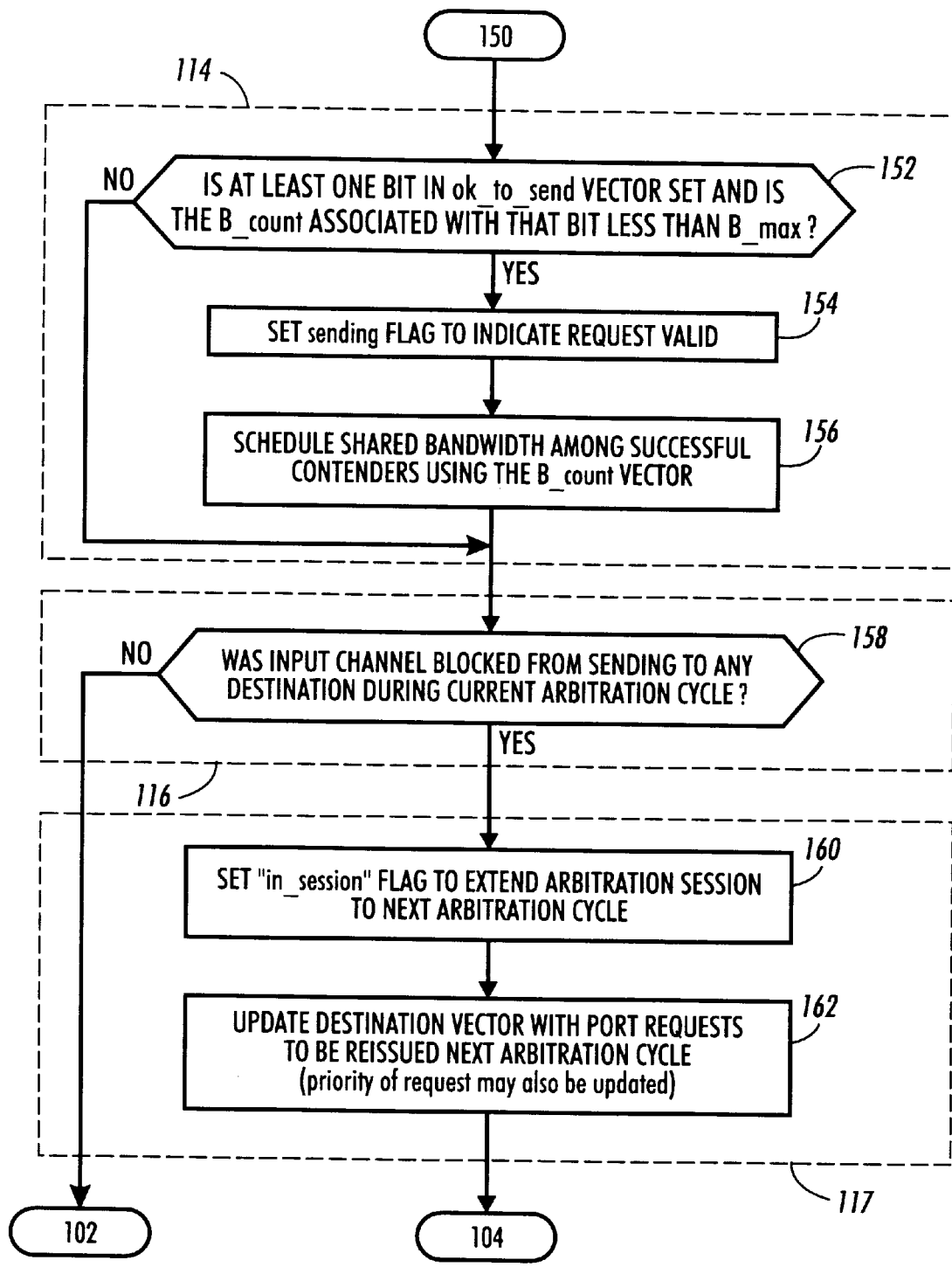
FIG. 16 illustrates a flow chart detailing steps 114, 116, and 117 shown in FIG. 13 that relate to determining which arbitration units have won a current arbitration cycle.

FIG. 16 illustrates a flow chart detailing steps 114, 116, and 117 shown in FIG. 13 for determining which arbitration units have won a current arbitration cycle. Initially at step 152, a first determination is made as to whether a cell can be sent during the next switch cycle to at least one requested destination output channel 13 of the switching network 10. This first determination is made by each arbitration unit by testing whether at least one bit in the ok_to_send destination vector was set for an output port 16 at step 136. In addition, a second determination is made by each arbitration unit whether the B_count in the B_count vector relating to the destination output port corresponding to the bit set in the ok_to_send-destination vector is less than B_max. If a cell of an arbitration unit is not scheduled to be sent during the next switch cycle, step 158 is executed; otherwise, step 154 is executed.

At step 154, the "sending" flag is set to TRUE when both rounds of arbitration have successfully arbitrated for access to the switching network 10. The "sending" flag is transmitted at the close of an arbitration cycle by an arbitration unit 15 to its cluster controller 24. Upon receipt of a sending flag set to TRUE, a cluster controller 24 prepares to transmit a cell on switching network 10 during the next switch cycle.

At step 156, shared switching network bandwidth is scheduled among successful contenders using the B_count vector. Resources are properly distributed if the successful contenders do not interfere with each other when accessing the shared switching network bandwidth. For example, in the bus based switching network shown in FIGS. 6 and 8, bus slots are allocated to each cell that successfully arbitrated for access to an output port 16 during the next switch cycle. However, an indication that a cell has successfully contended for an output port does not schedule a bus slot for transmitting that cell over the switching network to the output port during the next switch cycle.

In the bus-based switching network, time slots of the bus bandwidth are allocated using the "B_counter" of each successfully contending arbitration unit 15. (As set forth above, the B_counter is incremented during an arbitration cycle each time an arbitration unit 15 defers to another arbitration unit during an arbitration stage.) The value for the "B_counter" of a successfully contending arbitration unit is stored in a time "slot vector" which is output from the arbitration unit 15. More specifically, the time slot for a given cell is specified using the "B_counter" for the bus since the value for each counter is unique for each arbitration unit. This principle also holds true when the B_counter vector contains more than one counter, since each B_count in the vector is unique for each "$B_n$". In an alternate embodiment, the "B_counter" is used with parallel networks or fabric-based networks that are space multiplexed instead of time multiplexed. For example, in this alternate embodiment every "time" slot can be used to represent a unique routing network. Accordingly, the "B_counter" can be used to direct multiple input ports to output cells to unique routing networks at the end of an arbitration cycle.

At step 158, a determination is made by each arbitration unit whether an input channel 12 is blocked from transmitting cell data destined to an output channel(s) 13. If no destination input channel 12 is blocked then step 102 is executed; otherwise, steps 160 and 162 are executed.

At step 160, the "in_session" flag of an arbitration unit is set to TRUE to indicate to the cluster controller 24 that the current arbitration session did not complete during the current arbitration cycle. An arbitration unit 15 must resubmit in one or more subsequent arbitration cycles an arbitration request for a destination output port(s) for which the arbitration unit was not granted a reservation during the current arbitration cycle. In resubmitting an arbitration request, the intrinsic priority of the cell data may be updated to reflect a prior unsuccessful arbitration cycle(s). In addition, the "in_session" flag is set to TRUE to indicate that the current arbitration session is to continue into the next arbitration cycle. At step 162, the destination vector is updated with output port requests that must be reissued during a subsequent arbitration cycle. Reissued arbitration requests are requests that have not won arbitration during the current arbitration cycle. These requests may include a subset of the destination output channels 13 of a multicast cell.

E. Reservation Ring Arbitration for Multicast Cells

McKeown et al. discloses in "Scheduling Multicast Cells In An Input-Queued Switch", IEEE InfoCom, published in March, 1996, (ISSN 0743-166X), a work-conserving policy for scheduling cells in an input-queued multicast ATM switch. The work-conserving policy permits a multicast cell to be copied to its specified destination ports over several switch cycles (i.e., cell times).

Switch 5 shown in FIG. 1 efficiently manages multicast or broadcast operations over the intercluster switching network 10 in one pass. When a cluster module 8 identifies a cell as multicast traffic, as opposed to unicast traffic, the multicast cell is directed to an input queue 50 so that it is later transferred over the switching network. In an alternate embodiment which reduces switch latency and the load on the switching network, multicast traffic destined to ports within a cluster module is not directed to an input queue but instead is directed to an output queue within the cluster module thereby avoiding transfer over the switching network.

As described previously, FIG. 13 illustrates a flow chart depicting the general steps performed by each arbitration unit 15. As defined above an arbitration "cycle" includes a first arbitration round for arbitrating for output channels (steps 106 and 108), and a second arbitration round for arbitrating for switching network bandwidth (steps 110 and 112). An arbitration unit 15 may not successfully arbitrate for each destination channel 13 of a multicast cell during an arbitration cycle because of either output channel contention or switching bandwidth contention. If a reservation is granted for any output destinations of a multicast cell, then the multicast cell is output onto the switching network during the next switching cycle with its ok_to_send destination vector set to those output destinations. However, if a reservation is not granted for any output destinations of the multicast cell then the multicast cell is reissued during the next arbitration cycle for those output destinations. An arbitration session is complete only when all requests that are part of the session are granted reservations. Typically, an arbitration session that extends over more than one arbitration cycle, extends over consecutive arbitration cycles. However, an arbitration session may result in transmitting a multicast cell over multiple non-consecutive switch cycles.

Each output port for which a reservation was granted is recorded in the ok_to_send-destination vector stored in the state logic of each arbitration unit 15. Each bit in the ok_to_send-destination vector corresponds to a destination port of the switch 5. At the end of an arbitration cycle, the ok_to_send—destination vector is output on grant line 83 to switching network interface 18. In an alternate embodiment which reduces the number of pins in an integrated circuit, bits in the ok_to_send-destination vector are replaced with output port identifiers. This implementation requires that the destination field specify a set of destination ports.

Figure 17A:
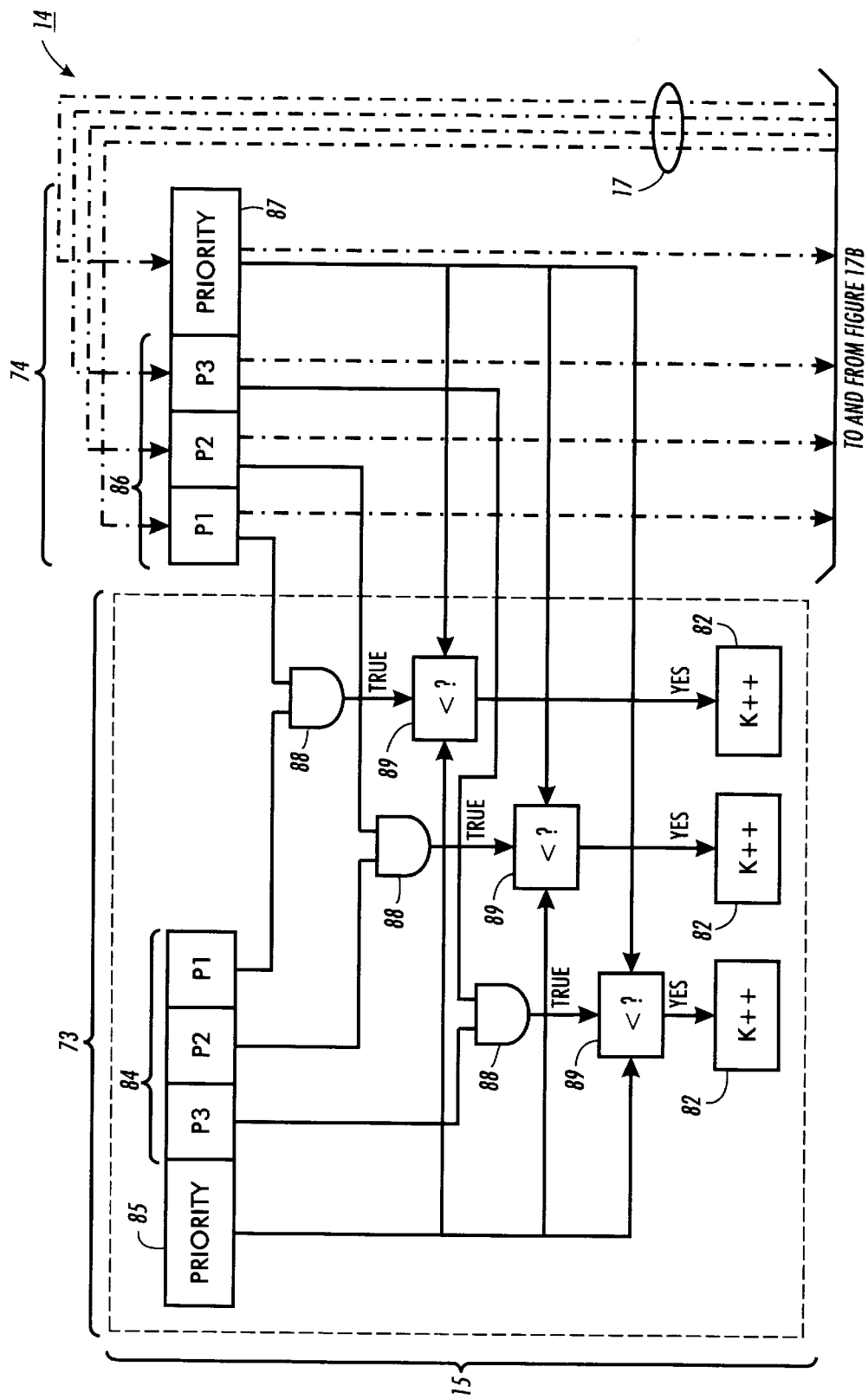
FIGS. 17A–17C schematically illustrate the reservation ring 14 performing multicast arbitration.
Figure 17B:
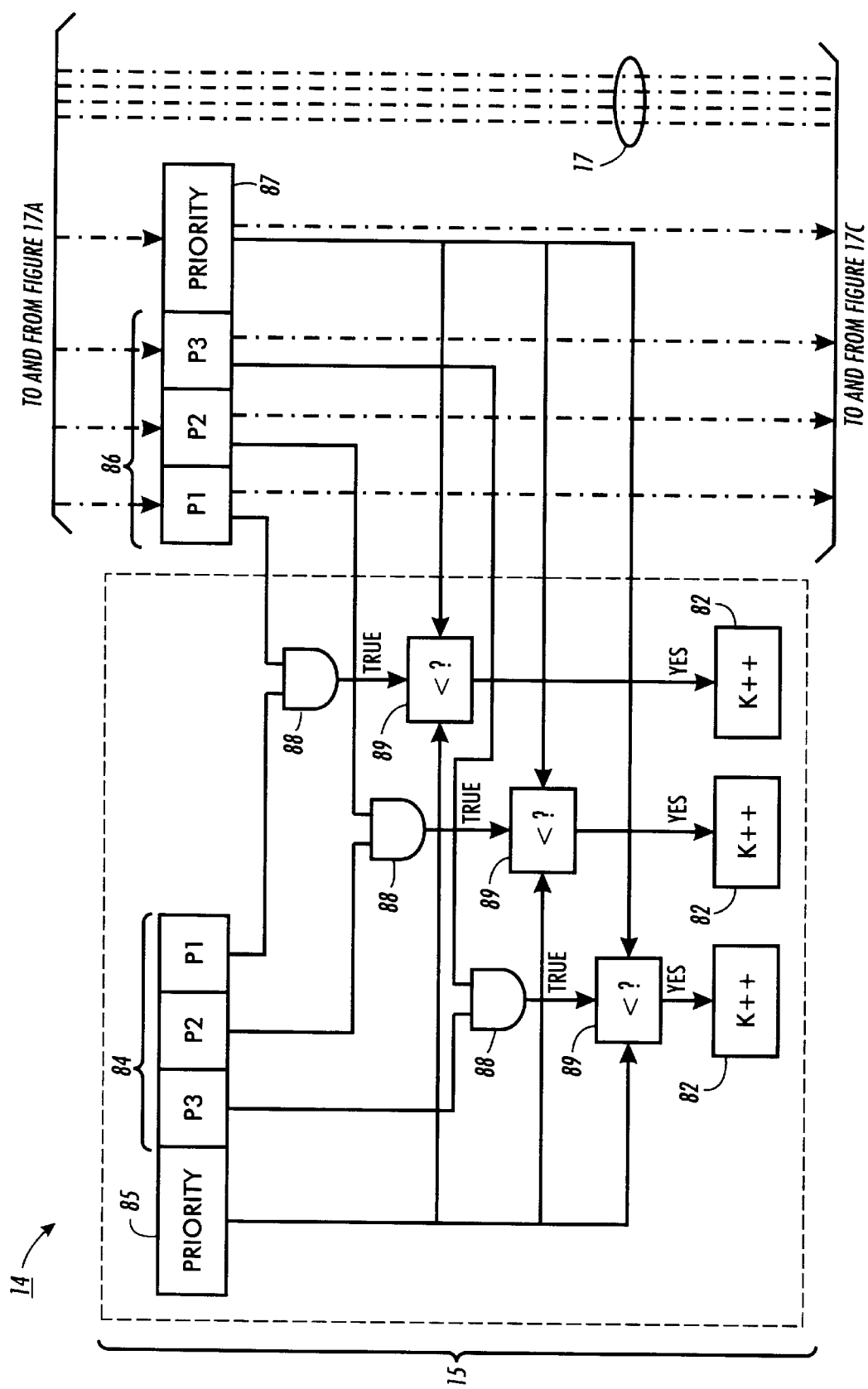
Figure 17C:
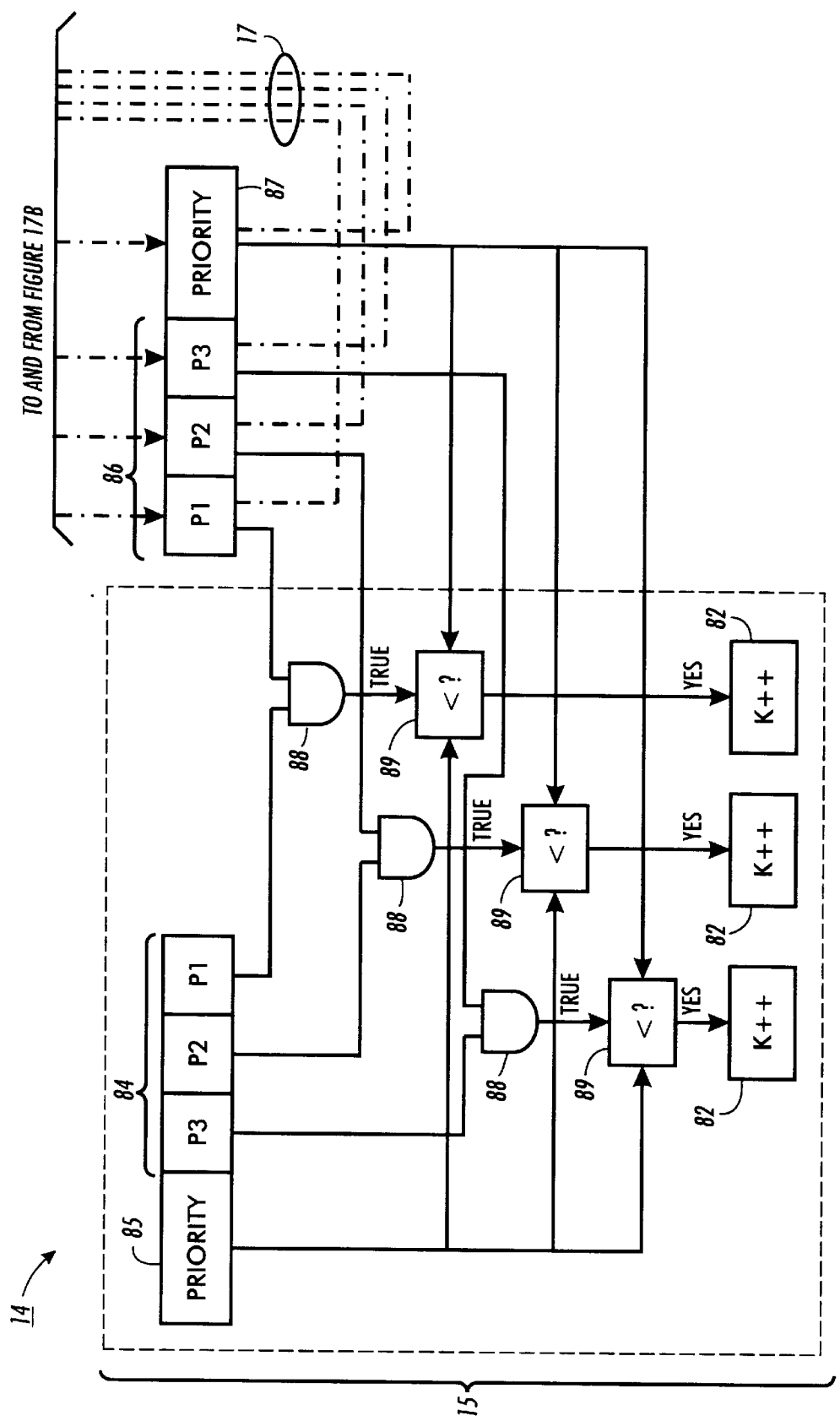

FIGS. 17A–17C schematically illustrate the reservation ring 14 performing multicast arbitration. The reservation ring shown in FIGS. 17A–17C includes three arbitration units 15. The internal registers of each arbitration unit are indicated generally by reference numeral 73, and the interface shift registers are indicated generally by reference numeral 74. Each arbitration unit has a resident destination vector 84, a resident priority value 85, a shifted destination vector 86, and a shifted priority value 87. The resident and the shifted destination vectors 84 and 86 each have three bits P1, P2, and P3, respectively. These three bits P1, P2, and P3 correspond to three output channels 13 of a switching network 10. Forming part of each cluster module 15 are comparators 88 that determine whether two values are equal and comparators 89 that determine whether one value is greater than another value. In addition, each cluster module has an array of destination K_counter vectors 82 that records one K_counter for each bit representing an output channel 13 defined in the resident destination vector 84. As defined above, each output channel 13 is associated with one or more destination output ports 16.

Each arbitration round of the reservation ring 14 shown in FIGS. 17A–17C has three arbitration stages. During the first arbitration stage, each arbitration unit copies its resident destination vector 84 into its shifted destination vector 86. Also, during the first arbitration stage, each arbitration unit resets to zero each K counter in its K_counter vector 82. Before starting the second and third arbitration stages, the reservation ring shifts the interface shift register vector 74 onto arbitration ring lines 17. During the second and third arbitration stages, each arbitration unit 15 determines whether each bit P1, P2, and P3 in the resident destination vector 84 is equal to each bit P1, P2, and P3 in the shifted destination vector 86, respectively. If any of the comparators 88 for each of the three bits P1, P2, or P3 indicate that the resident and shifted destination vectors are requesting the same output channel 13, then comparators 89 evaluate whether the resident or shifted destination vector has priority. The resident and destination priorities 85 and 87 include the priority booleans, "valid", "T", "Rsv", "MCast", and "in_session" that are described above and shown in FIG. 12. It the shifted priority is greater than the resident priority then K_counter corresponding to that destination bit is incremented.

If any of the K_counters in the K_counter vector 82 have reached a maximum value (e.g. dest_K_max—shown in FIG. 12) then the cell being arbitrated is arbitrated again during the next arbitration cycle with the associated destination bit(s) set. Because each arbitration stage uniquely defines a priority for each arbitration unit, the value of the K_counters can be used to define an exact input to output mapping of the switching network 10. Since more than one K_counter may be less than dest_K_max for one arbitration unit 15, it is possible to for multiple output channels 13 to receive a data packet from a single input channel 12. In an embodiment in which the switching fabric is a crossbar fabric, multiple crossbar output channels may receive a cell from a single input channel. This acts as a copy mechanism for multicast cells. In the embodiment in which the switching network is a bus, copying of multicast cells is achieved by multiple output channels reading from the bus at once.

In an alternate embodiment, an arbitration request is terminated before every output destination of a multicast packet has been issued at step 116 (FIG. 13) to avoid prolonged blocking by the multicast cell. In this embodiment, the arbitration unit 15 returns an unsuccessful arbitration request to the cluster controller 24. At which point, the cluster controller decides whether to resubmit the returned arbitration request or submit a new arbitration request to the arbitration unit 15, at step 102.

F. Automatic Sizing of Reservation Rings

The modular hierarchical switch architecture described above can be used to implement switches 5 having either a large or a small number of ports 16. The number of ports 16 can be increased by increasing the number of cluster modules coupled to intercluster switching network 10 or by increasing the number of ports per cluster module. Accordingly, an intercluster switching network 10 that is readily expandable or contractible permits the number of cluster modules 8 coupled to input channels 12 and output channels 13 of the intercluster switching network 10 to vary. A switching network that is fully populated has a cluster module 8 associated with each input channel 12 and output channel 13 combination. A switching network 10 that does not have each of its channels 12 and 13 coupled to a cluster module are defined herein as partially populated switching networks. In other words, a switching network with any input channels that have not been populated to receive data packets is a partially populated switching network.

Switches that are partially populated permit incremental expansion and contraction of reservation ring 80 without modifying the original configuration of the system. In addition, switches that can be partially populated permit deploying multiple versions of the switch using identical printed circuit boards, thereby reducing manufacturing costs. Also, automatically determining the number of channels populating a switching network does not permit resource conflicts to occur that may result in damaged network hardware if ring arbitration units were to have inconsistent views of the size of the reservation ring. Network hardware may be damaged when inconsistent views of the size of the reservation ring permit too many input channels to access the switching network at once. The methods described below advantageously eliminate this potential error condition.

F.1 Automatic Sizing Using Dual Tokens

Figure 18:
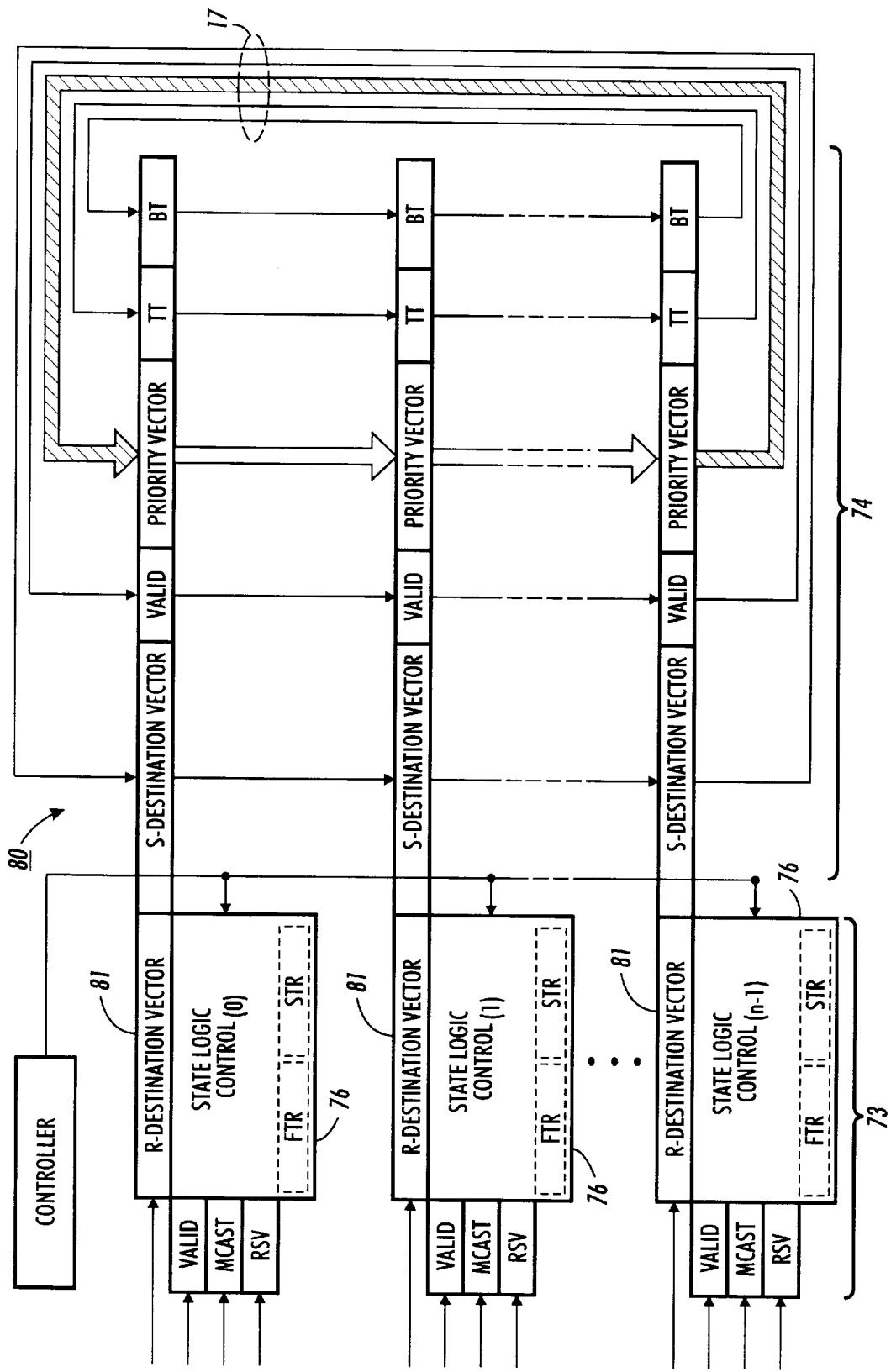
FIG. 18 illustrates one embodiment for automatically determining the length of a reservation ring.

FIG. 18 illustrates a first embodiment for automatically determining the size of a reservation ring 80 to permit configuration of partially populated rings. In this first embodiment, each arbitration unit 81 on the arbitration ring 80 automatically detects when an arbitration cycle has completed. Accordingly, the reservation ring 80 can be used to provide partially populated communication switches.

Generally, the reservation ring 80 is similar to the reservation ring 14 described above and shown in FIGS. 11 and 12. Arbitration for shared network resources (e.g. network bandwidth) is distributed between a plurality of arbitration units 81. Each arbitration unit 81 is coupled by wires 17 to form communication ring 80. During an arbitration cycle, arbitration requests from each arbitration unit 81 are shifted to each arbitration unit on the ring 80. As an arbitration request is shifted from one arbitration unit to the next during an arbitration cycle, each arbitration unit compares the shifted arbitration request in the "S-Destination Vector" with the arbitration unit's request in the resident "R-Destination Vector". During each shift in the arbitration cycle, each arbitration unit updates its local state stored in the control state 76. At the end of an arbitration cycle, all the arbitration units 81 on the ring 80 have computed consistent arbitration results for network access.

In contrast with the reservation ring 14 shown in FIGS. 11 and 12, the boolean variables "first token received" (FTR) and "second token received" (STR) are substituted for the "length" variable in the control state 76 (shown in FIG. 12) of the reservation ring 80. In addition, the reservation ring 80 has an additional Top Token bit (TT) and an additional Bottom Token bit (BT) as shown in FIG. 18. The Bottom Token bit (BT) is shifted in the opposite direction of all other data in the interface shift register 74. It will be understood by those skilled in the art, however, that for the purpose of this embodiment all that is required is that the Bottom Token bit (BT) and the Top Token bit (TT) are shifted in opposite directions around the reservation ring 80.

Figure 19:
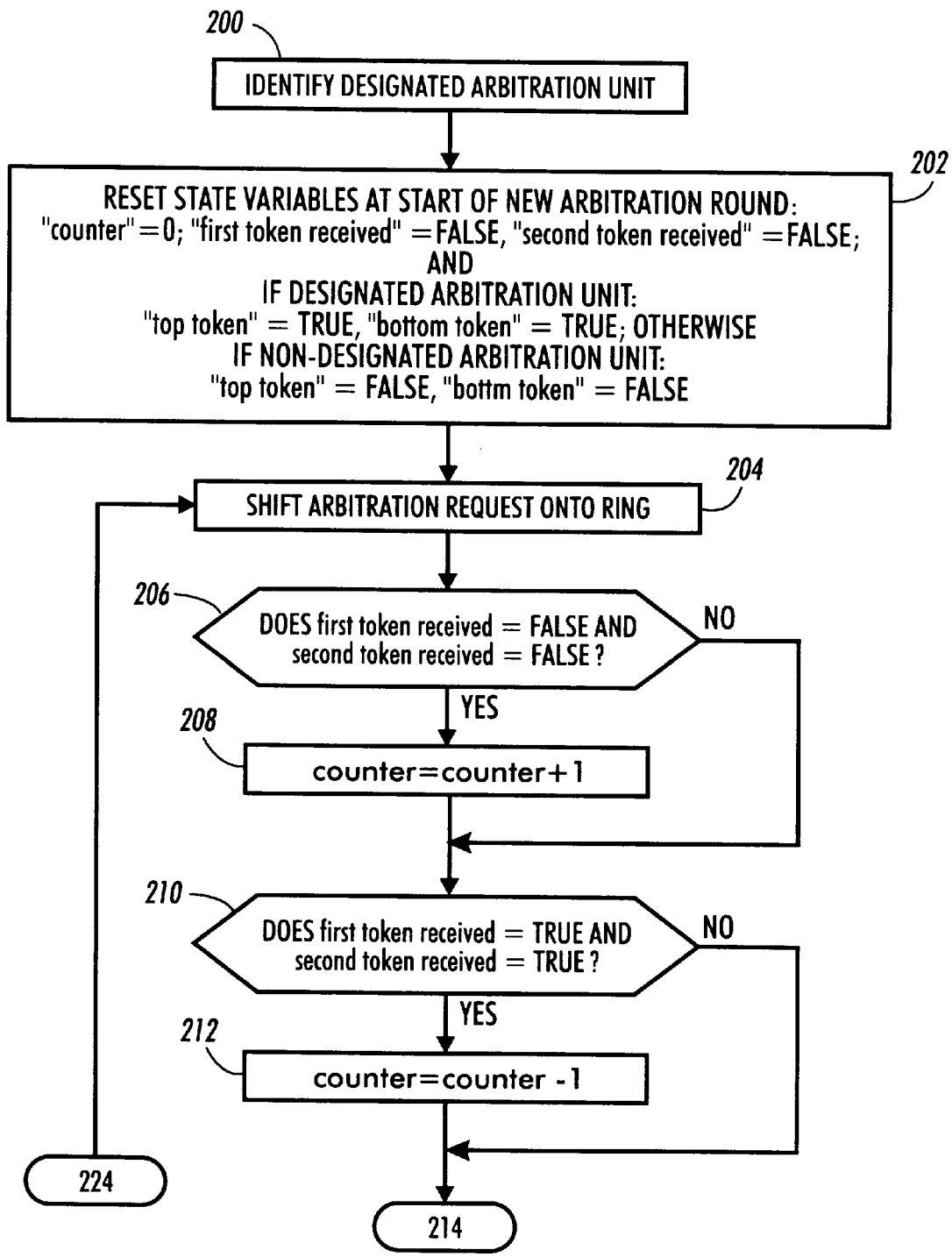
FIGS. 19 and 20 illustrate a flow chart depicting the general steps performed by each arbitration unit forming the arbitration ring in FIG. 18.
Figure 20:
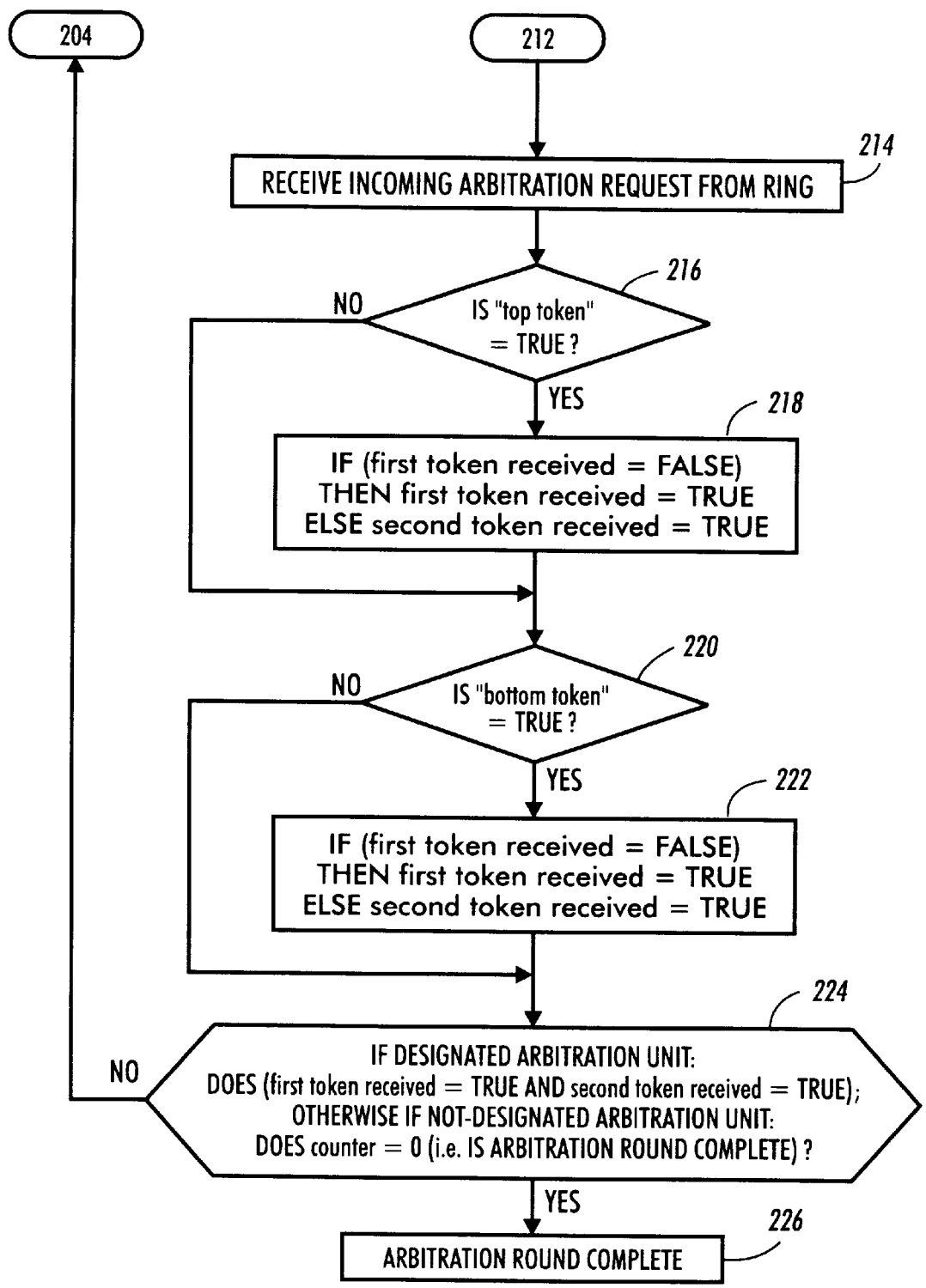

FIGS. 19 and 20 illustrate a flow chart depicting the general steps performed by each arbitration unit 81 of ring 80 to determine the length of the ring during an arbitration round. An arbitration round is complete when each arbitration unit 81 receives its arbitration request after traveling once around the ring. For example, assuming that there are four arbitration units 81 on ring 80, an arbitration round completes when each arbitration request has shifted four times. An arbitration cycle includes two arbitration rounds as described in the arbitration method shown in FIG. 13. An arbitration session which may include one or more arbitration cycles is defined with respect to a particular destination channel. An arbitration session starts once a set of concurrent arbitration requests requesting a particular destination are issued to the arbitration units on the ring. An arbitration session is concluded when the set of concurrent arbitration requests have been successfully issued into the switching network 13.

At step 200, one of the arbitration units 81 in the ring 80 is identified as a designated arbitration unit at the start of an arbitration cycle or during system power up or reset. The method for identifying a designated arbitration unit is independent from the method for automatically sizing the reservation ring. In addition, neither the particular method used to assign a designated arbitration unit, nor the method for automatically sizing the reservation ring require that the designated arbitration unit be the same during each arbitration cycle. Identification of a designated arbitration unit can be performed in a number of ways and at different times.

A first method for identifying a designated arbitration unit requires that each arbitration unit be assigned a unique identification number. These identification numbers are assigned to each arbitration unit in a monatomic increasing order around the ring 80. At either system power up or during an arbitration cycle reset, each arbitration unit shifts its identification number onto the ring. Subsequently, each arbitration unit compares its own identification number with the identification number it received off the ring. The arbitration unit on the ring that finds the identification number it received off the ring to be greater than its own identification number becomes the designated arbitration unit. A second method for identifying a designated arbitration unit is to dynamically assign the designated arbitration unit in a round robin manner between arbitration cycles (as described above using current_ring_tail and nxt_ring_tail). Generally, the designated arbitration unit can be any arbitration unit on ring 80 that is guaranteed to be present during the associated arbitration cycle.

At step 202, each arbitration unit 81 on ring 80 is reset for a new arbitration round (where step 201 is analogous to step 104 shown in FIG. 13). Specifically, at step 202, the state variable "counter", "first token received" (FTR), and "second token received" in each arbitration unit 81 are reset to 0, FALSE, and FALSE, respectively. In addition, the "top token" (TT) and "bottom token" (BT) bits of the designated arbitration unit, identified at step 200, are both set to TRUE. In contrast, the "top token" (TT) and "bottom token" (BT) bits of other arbitration units on ring 80 that are not the designated arbitration unit are both reset to FALSE.

At step 204, each arbitration unit 81 shifts an arbitration request onto the ring 80. All parts of each arbitration request are shifted in one direction around the ring except for the "bottom token" (BT) bit which is shifted in the opposite direction, as shown in FIG. 18.

At step 206, each arbitration unit 81 tests whether "first token received" (FTR) and "second token received" (STR) are both set to FALSE. If both tokens are set to FALSE at step 206, then the state variable "counter" is incremented by one at step 208. At step 210, each arbitration unit tests whether both tokens (i.e., FTR and STR) are both set to TRUE. If both tokens are set to TRUE at step 210, then the state variable "counter" is decremented by one at step 212. Steps 206–212 are not performed by the designated arbitration unit as will become evident below.

At step 214, each arbitration unit 81 receives an incoming arbitration request from the ring 80. Each incoming arbitration request includes an "S-Destination Vector", a "valid" bit, a "Priority Vector", a TT token, and a BT token. The priority vector may include the priority booleans "T" (or Token bit), "Rsv", "MCast", and "in_session" that are described above and shown in FIG. 12.

After receiving a shifted arbitration request from the ring, each arbitration unit tests whether the "top token" in the request is TRUE, at step 216. At step 218, if "top token" is TRUE then the state variable "first token received" (FTR) is set to TRUE if it was not previously set to TRUE, otherwise the state variable "second token received" (STR) is set to TRUE. Similarly, steps 216 and 218, are repeated for "bottom token" at steps 220 and 222, respectively.

At step 224, the designated and the non-designated arbitration units test whether the arbitration round has completed. Specifically, the designated arbitration unit tests whether both the "first token received" (FTR) and the "second token received" (STR) are both set to TRUE. If this condition is true for the designated arbitration unit, then the designated arbitration unit identifies that the arbitration round has completed at step 226. In contrast, the non-designated arbitration units test whether the "counter" variable is equal to zero. If the "counter" variable is equal to zero, then each of the non-designated arbitration units know that an arbitration round has completed at step 226. Otherwise, when the conditions at step 224 are not met, step 204 is repeated.

Figure 21:
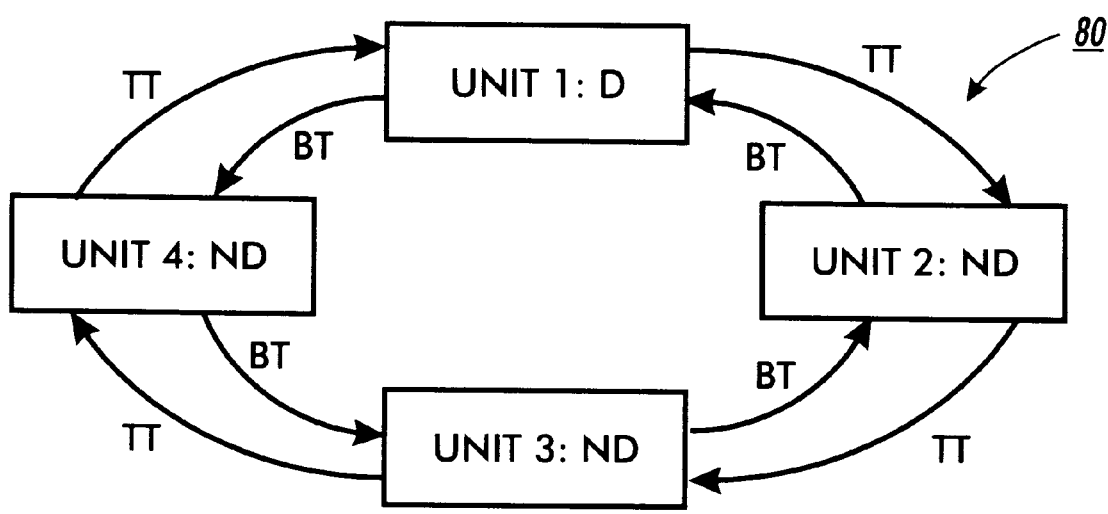

FIGS. 21 and 22 illustrate an example of how the reservation ring 80 shown in FIG. 18 and described in FIGS. 19 and 20, operates. FIG. 21 illustrates the physical makeup of the ring used in this example. The ring 80 includes four arbitration units, with arbitration unit 1 being a designated (D) arbitration unit, and arbitration units 2, 3, and 4 being non-designated (ND) arbitration units. FIG. 21 also illustrates that a "top token" (TT) is shifted in the clockwise direction around the ring 80, while a "bottom token" (BT) is shifted around the ring 80 in the counter-clockwise direction. FIG. 22 is a table that indicates the values of the variable "counter", "first token received" (FTR), "second token received" (STR), "top token" (TT), and "bottom token" (BT) at each stage of an arbitration round. Because the ring 80 shown in FIG. 21 is made up of M=4 arbitration units, there are four stages in an arbitration round.

Referring now to the Table shown in FIG. 22 and the flow charts shown in FIGS. 19 and 20, at the beginning of each arbitration stage the variables shown in the table are initialized as set forth in step 202 in FIG. 20. The table in FIG. 22 shows that for all non-designated nodes (ND), the amount of time it takes for the top token (TT) to reach a particular arbitration unit (e.g. arbitration unit 2) is the same amount of time required for the bottom token (BT) to finish traveling around the ring after reaching the particular arbitration unit. At the beginning of each arbitration stage, each arbitration unit passes its top token (TT) in one direction and its bottom token in the opposite direction.

After the first stage of arbitration, the top token (TT) of the designated arbitration unit 1 is shifted to the non-designated arbitration unit 2, and the bottom token (BT) of the designated arbitration unit 1 is shifted to the non-designated arbitration unit 4. The counter control (C-Control) column indicates what operation is being performed on the counter variable during each stage (i.e., "+" indicates that the counter is incremented by one, "−" indicates the counter is decremented by one, and "#" indicates the counter is not changed). Thus, at completion of stage 1 each counter of arbitration units 2, 3, and 4 have been incremented by one.

At completion of stage 2, arbitration unit 3 receives a top token (TT) and a bottom token (BT) that are both TRUE. The counter of arbitration unit 2 is the only counter that is incremented in stage 2. At completion of stage 3, each of the non-designated arbitration units 2, 3 and 4 have each received a first token and a second token as indicated by the first token received (FTR) and the second token received (STR) variables being set to true. During stage 4, the final stage, the non-designated arbitration units 2, 3, and 4 know that the arbitration round has completed because each counter variable is set to zero (i.e., step 224 in FIG. 20). The designated arbitration unit 1, on the other hand, knows the arbitration round has completed because both the top token (TT) and the bottom token (BT) are set to TRUE.

An advantage of this method for automatically detecting the size of an arbitration ring is that the overhead to add this detection method to a ring is small. For example, the size of a request is increased by two bits. Also, each channel is not required to detect its own request before determining the size of the arbitration ring 80.

Figure 23:
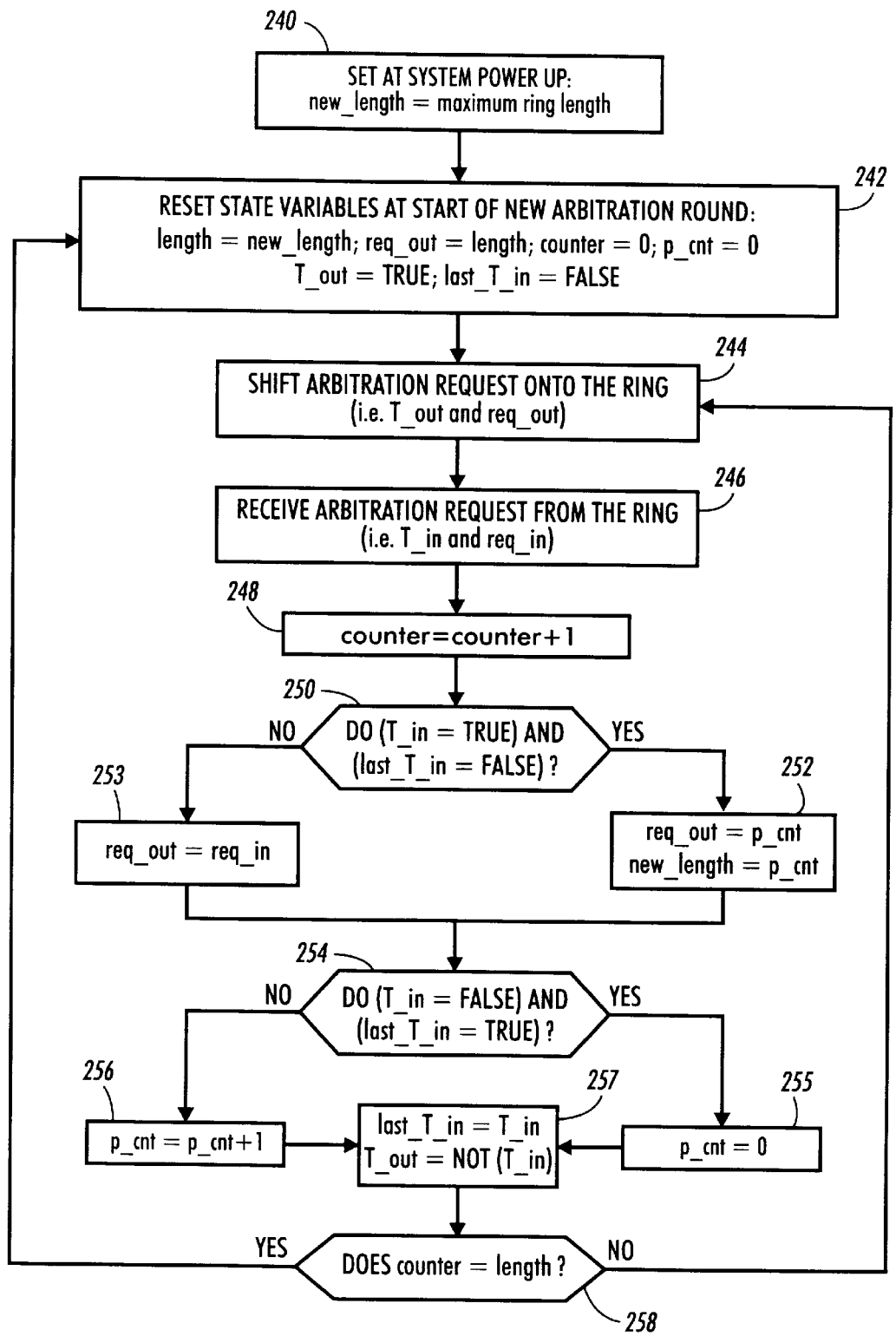
FIGS. 23 and 24 illustrate a flow chart depicting the general steps performed by each arbitration unit of the reservation ring shown in FIG. 11 in another embodiment for automatically determining the length of a reservation ring.
Figure 24:
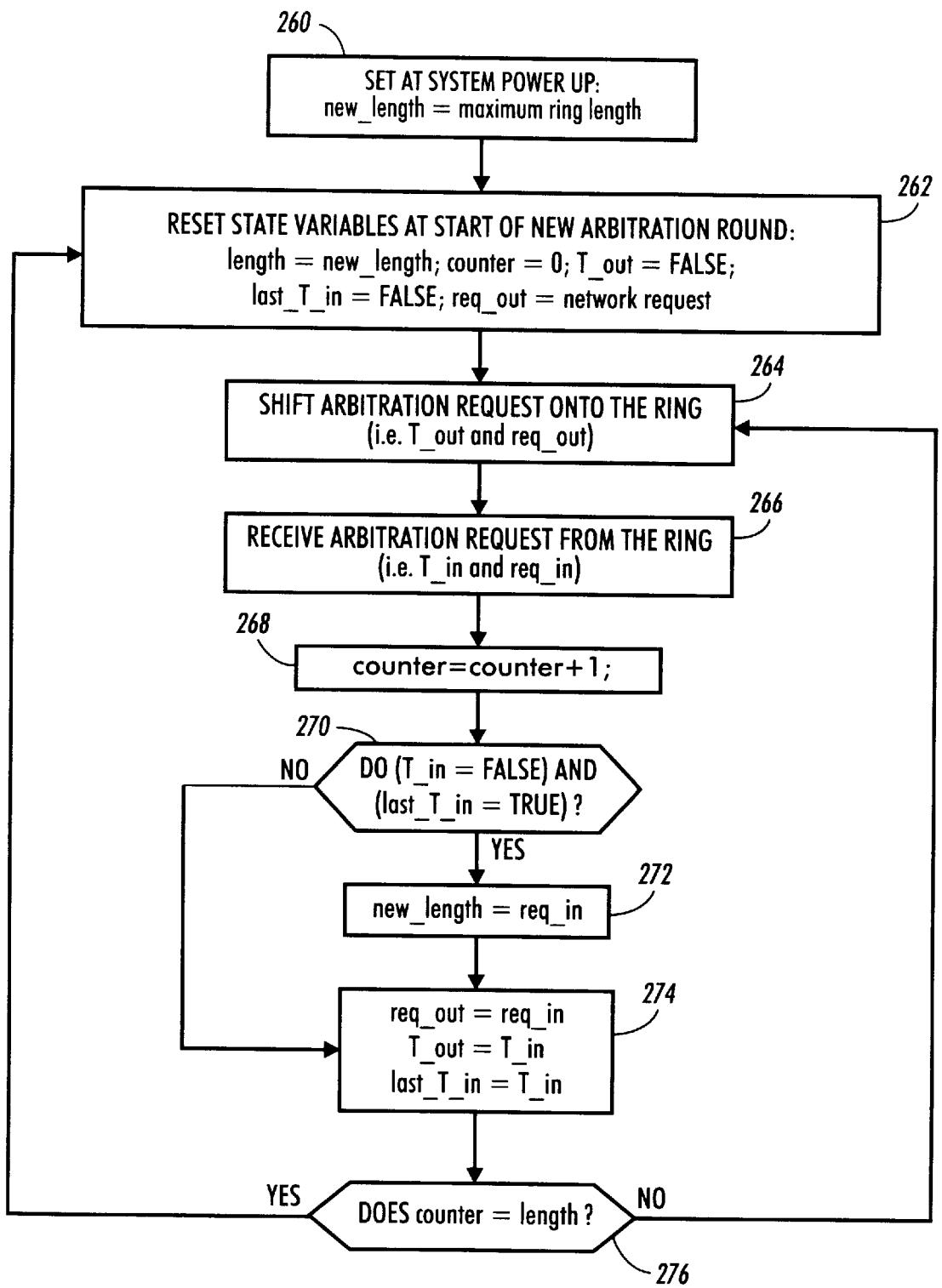

F.2 Automatic Sizing Using One Token and a Length Determination Arbitration Unit FIGS. 23 and 24 illustrate a flow chart detailing another method for automatically sizing the length of a reservation ring. In this embodiment, a length determination arbitration unit calculates the length of the ring each arbitration cycle by observing a "token" or "T" bit shifted around the ring each arbitration round. Once the length of a reservation ring is determined by a designated arbitration unit, the determined length is passed to the rest of the arbitration units on the ring. Unlike the first embodiment of an automatic sizing method described above, this second automatic sizing method uses an additional stage of arbitration. For example, if a reservation ring normally requires "n" stages to complete an arbitration round, this embodiment uses n+1 stages. However, this automatic sizing method requires two less tokens than the first automatic sizing method described above. Consequently, the reservation ring in FIG. 11, which advantageously requires two less wires than the reservation ring shown in FIG. 18, can be used to perform this embodiment for automatically determining the length of a partially populated reservation ring.

What differentiates this embodiment from the previous embodiment described above is that the distinguished arbitration unit in this embodiment includes a length determination arbitration unit. An additional distinction is that only one token bit "T" is shifted around the ring during an arbitration round. For example, a designated arbitration unit "UNIT 1:D" operates in conjunction with a length determination arbitration unit "UNIT 0:P" as indicated by reference number 98 in FIG. 25. However, the addition of a length determination arbitration unit results in an additional arbitration stage each arbitration round. For example, FIG. 25 shows a ring with four arbitration units plus a length determination arbitration unit, thereby using five arbitration stages to completely shift an arbitration request around the ring.

A reservation ring using a single "T" or "token" bit is described in U.S. Pat. No. 5,519,698. As disclosed in U.S. Pat. No. 5,519,698, the "T" bit is set to one by the distinguished arbitration unit at the start of an arbitration session. This "T" bit is used to break ties between arbitration units during a stage of arbitration by indicating one arbitration unit has priority over another. Unlike the "T" bit in U.S. Pat. No. 5,519,698, the "T" bit in the present invention is returned to the designated arbitration unit as is illustrated in FIG. 11. Since the designated arbitration unit is the only arbitration unit that can set the "T" bit, the designated arbitration unit knows when the "T" bit has traveled once around the ring. During an arbitration round, the designated arbitration unit counts the number of arbitration stages before receiving a "T" bit equal to one. The resulting count is used to define the length of the ring. This count is subsequently distributed to the other non-designated arbitration units on the ring.

Similar to the first embodiment, this embodiment enables reservation rings to be readily increased or decreased in size without requiring a hardware configuration change. Also, this embodiment, similar to the previous embodiment, requires the identification of a designated arbitration unit as set forth at step 200 in FIG. 19. As described above the designated arbitration unit can be selected in a number of ways. Once the designated arbitration unit is selected, the length determination arbitration unit which forms part of the designated arbitration unit performs the steps set forth in FIG. 23, while the non-designated arbitration units and the designated arbitration unit, perform the steps set forth in FIG. 24. The length determination arbitration unit unlike every other unit on the ring outputs onto the ring the length of the ring in place of an arbitration request.

Figure 25:
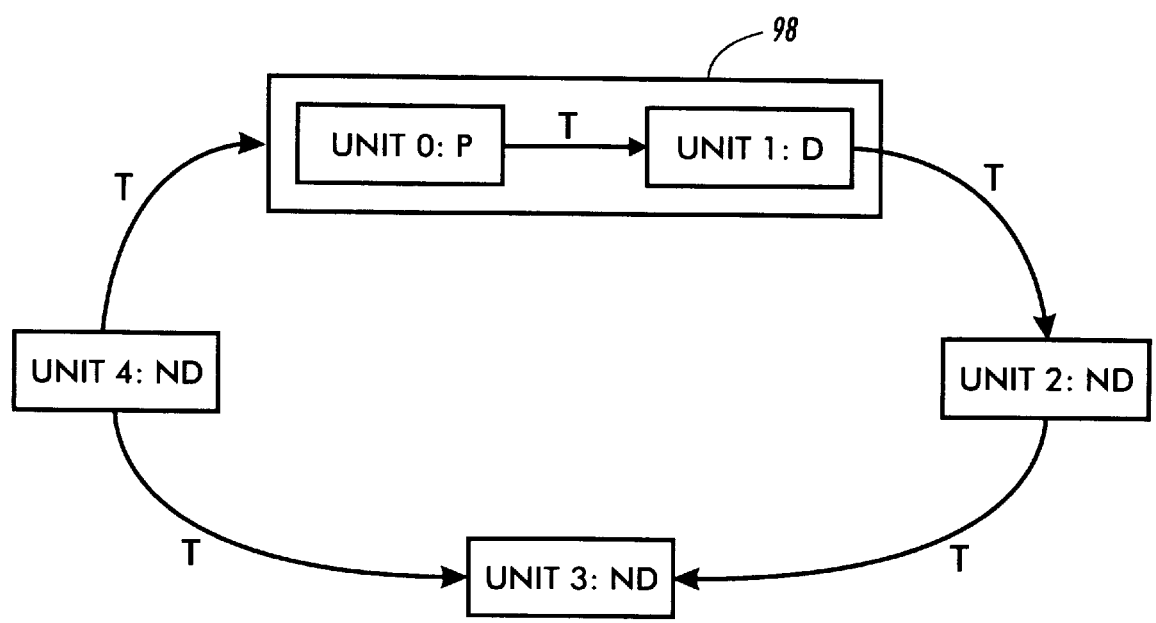

FIG. 23 illustrates the steps performed by the length determination arbitration unit (i.e., UNIT 0:P) shown in FIG. 25. These steps are performed to automatically determine how many arbitration units populate a reservation ring of an unknown length so that a partially populated arbitration ring can operate efficiently. In addition, this method for automatically determining ring length ensures that switching network hardware operates safely. Switching network hardware operates safely when no more than a defined number of input channels access the switching network at once.

Initially at step 240, the length determination arbitration unit assumes that the length of the ring is the maximum length when hardware of the ring is fully populated. This step is performed at system power up or arbitration cycle reset when the length determination arbitration unit has not yet determined the number of arbitration units defining the ring. The number of arbitration units on the ring is assumed to be the maximum number of arbitration units that the ring can sustain in order to insure that the ring hardware operates safely during the initial arbitration round. By overestimating the length of a ring instead of underestimating it, arbitration units will be less likely to win an arbitration round. In accordance with this assumption, at step 240, the "new_length" variable is set to the maximum ring length.

At step 242, the length determination arbitration unit resets its state variables before initiating a new arbitration round. These state variables are stored in the control state 76 of the length determination arbitration unit. Specifically, at step 242, a "length" variable which indicates the length of the ring during an arbitration round is set to new_length. Also, "counter" is reset to zero. The counter variable counts the number of stages as an arbitration round progresses. The state variables "T_out" is set to TRUE and "last_T_in" is set to FALSE. Also, "req_out" is set to equal the length variable, and the p_cnt variable, which is records the number of arbitration units on the ring, is set to zero.

At step 244, the "pseudo" arbitration request of the length determination arbitration unit is shifted onto the ring. The pseudo arbitration request is stored in the state variables T_out and req_out. The T_out or token variable is set to TRUE so that the length determination arbitration unit will be able to determine when an arbitration round terminates. The req_out variable is used to store the length of the ring, which in the initial round is maximum length of the ring but in subsequent rounds is the length of the ring determined by the length determination arbitration unit after each arbitration round. At step 246, an arbitration request is received from the ring and stored in state variables "T_in" and "req_in". Subsequently at step 248, the counter state variable is incremented by one to indicate a stage of the arbitration round is about to begin.

At step 250, the T_in bit or token bit from the incoming arbitration request, and the last_T_in bit are tested to determine whether the length determination arbitration unit received its own pseudo arbitration request from the ring. If the T_in bit is TRUE and the last_T_in bit is FALSE then step 252 is executed; otherwise, step 254 is executed. At step 252, the next arbitration request to be put out on the ring at step 244 (i.e., req_out) is set to equal the determined length of the arbitration ring (i.e., p_cnt). In addition, the new_length variable is set to record the new length of the ring for the start of the next arbitration round. At step 253, the next arbitration request sent out on the reservation ring is set to equal the last request in (i.e., req_out=req_in).

At step 254, the length determination arbitration unit determines whether it has to re-broadcast the correct ring size since depending on the initial size of the ring requests may go around the ring multiple times. Specifically, at step 254, when the state variable T_in is FALSE and the state variable last_T_in is TRUE, then step 255 is executed; otherwise, step 256 is executed. At step 255, the variable p_cnt is reset to zero. At step 256, the variable p_cnt is incremented to record the presence of an additional arbitration unit on the ring.

At step 257, the last token received variable (i.e., last_T_in) is set to equal T_in, and the T_out variable is set to equal the inverse of the token received variable (i.e., T_in). Subsequently, at step 258, the counter variable is tested to determine whether it equals the length variable. If the counter variable equals the length variable then an arbitration round with the previously set length has completed and step 242 is repeated; otherwise, step 244 is repeated. When a new arbitration round starts at step 242, the length variable is updated with the value of the new_length variable which is set at step 252.

In another embodiment, the length determination unit sets the "valid" bit of each arbitration request to zero once a determination has been made that it has received its own pseudo arbitration request from the ring. As set forth above, the "valid" bit indicates whether an arbitration unit is participating in a current arbitration session. Thus, by setting the "valid" bit of each arbitration request to zero once each arbitration request has already traveled around the ring, no arbitration takes place by the designated and non-designated arbitration units during each subsequent arbitration stage for that arbitration request. In this embodiment, the "valid" bit is set to zero to ensure that each arbitration unit does not re-arbitrate with requests from other arbitration units or contend with its own arbitration request being shifted around the ring a second time.

FIG. 24 illustrates the steps performed by the designated arbitration unit and the non-designated arbitration units during an arbitration round, such as the arbitration units UNIT 1:D, UNIT 2:ND, UNIT 3:ND, and UNIT 4:ND, shown in FIG. 25. Similar to the length determination arbitration unit at step 240, the designated and the non-designated arbitration units initially set the state variable "new_length" to equal the maximum allowable ring length at step 260. At step 262, the state variables, which are stored in the control state 76 (shown in FIG. 11), are reset at the start of a new arbitration round. Specifically, at step 262, the state variables "length", "counter", "T_out", "last_T_in", and "req_out" are set to new_length, 0, FALSE, FALSE, and network request, respectively.

At step 264, a new arbitration request is shifted out onto the ring, and at step 266 a new arbitration request is received from the ring. At step 268, the counter variable is incremented to indicate the beginning of another stage of arbitration in an arbitration round. At step 270, each arbitration unit determines whether the arbitration request of the length determination arbitration unit has been received. This determination is made by testing whether T_in equals FALSE and last_T_in equals TRUE. If the arbitration request is determined to be from the length determination arbitration unit at 270 then step 272 is executed; otherwise, step 274 is executed. At step 272, the new_length variable is updated to equal the length of the ring which is stored in the pseudo arbitration request of the length determination arbitration unit. At step 274, the state variables req_out, T_out, and last_T_in are updated using the variables req_in, T_in, and T_in, respectively. If the counter variable is equal to the length variable at step 276, then the arbitration round is completed and step 262 is repeated; otherwise step 264 is repeated.

Figures 28, 29:
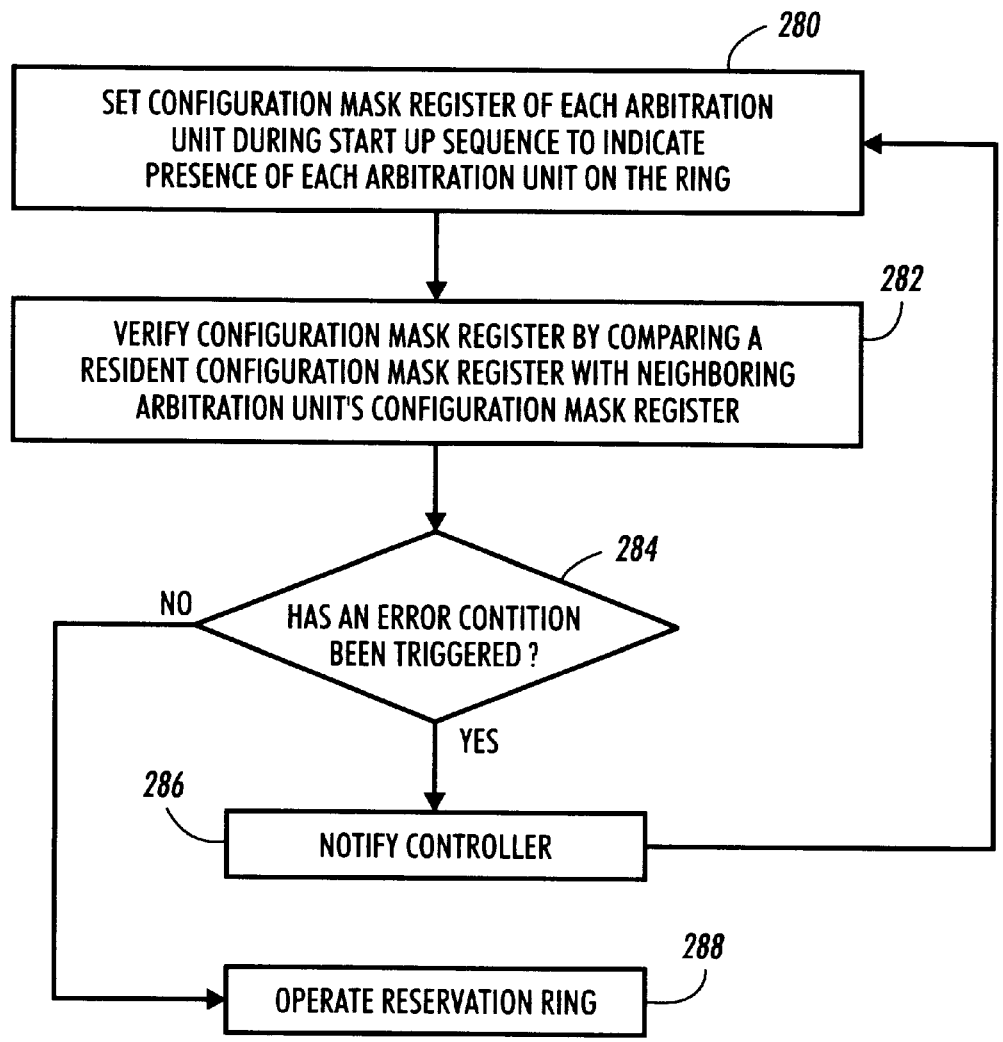

FIGS. 25, 26, 27, and 28 illustrate a manner of operating the method for automatically sizing a reservation ring shown in FIGS. 22 and 23. FIG. 25 schematically illustrates a reservation ring with four arbitration units and one length determination arbitration unit. FIGS. 26 and 27 show tables that record the values of the state variables in each arbitration unit shown in FIG. 25 during an arbitration round. More specifically, FIGS. 26 and 27 illustrate the values for the state variable when the reservation ring shown in FIG. 25 is only populated with four arbitration units, and the ring has a maximum number of eight arbitration units on the ring at one time. FIGS. 26 and 27 show that the first arbitration round will have nine stages (e.g., 0–8) when the maximum length of the arbitration ring is eight. Also, FIGS. 26 and 27 show that at the end of the arbitration round, the new_length variable is updated to indicate the current population of the ring. FIG. 28 is a table of the values of the state variables of each arbitration unit after completing the arbitration round shown in FIGS. 26 and 27.

In an alternate embodiment, the method for automatically sizing a reservation ring as shown in FIGS. 22 and 23 is executed once at power up to determine the length of the ring. In this alternate embodiment, two arbitration rounds are performed in which no arbitration for bandwidth of intercluster switching network takes place. The first arbitration round is performed to record the number of arbitration units on the ring and the second arbitration round insures that each arbitration unit has received an indication from the length determination arbitration unit of the length of the ring. After the length of the ring has been propagated to each of the arbitration units, the length determination arbitration unit can be disabled so that subsequent arbitration rounds do not include the length determination arbitration unit. This reduces the number of arbitration stages in an arbitration round by one (i.e., from n+1 to n).

In another alternate embodiment of the automatic ring sizing method described in FIGS. 22 and 23, an extra stage of arbitration is not required as described above. In this alternate embodiment, the length determination unit and the designated arbitration unit function together so that only one of the two is operating on the reservation ring at one time, thereby requiring only one arbitration stage between each of them. During arbitration cycles in which the length determination unit must communicate the length of the ring to non-designated arbitration units, the length determination unit is active and the designated arbitration unit becomes inactive. Conversely, when the length of the ring has already been updated in each length register of the non-designated arbitration units, the designated arbitration unit is active while the length determination unit is inactive. More specifically, the length determination unit operates during the first two rounds of arbitration. During the first round of arbitration, the length determination unit records the length of the ring. During the second round of arbitration, the length determination communicates the recorded length of the ring to the non-designated arbitration units. Subsequent rounds of arbitration are performed only by the designated arbitration unit unless the length determination unit detects that the reservation ring has been dynamically adjusted in length (i.e., one or more arbitration units have been added or removed from the ring). If the length determination unit has detected that the reservation ring has been dynamically adjusted, the length determination unit becomes active and communicates the new length of the ring to the non-designated arbitration units.

F.3 Automatic Ring Sizing Using a Configuration Mask Register

FIG. 29 illustrates yet another embodiment for automatically sizing the length of a reservation ring using a configuration mask register. At power up or system reset, step 280 shown in FIG. 29 is executed. At step 280, control software of the switch 5 (shown in FIG. 1) sets the configuration mask register of each arbitration unit during a system start-up sequence. The configuration mask register contains a sequence of bits. Each bit that is set in the configuration mask register corresponds to an arbitration unit on the ring. At step 282, each arbitration unit on the ring compares the configuration mask set at step 280 with the configuration mask register of its neighboring (i.e., right or left) arbitration unit. An error condition is triggered at step 284 when an arbitration unit determines at step 282 that its configuration mask register does not match its neighboring arbitration unit's configuration mask register. When an error condition is triggered at step 284, the control software of the switch is notified and step 280 is repeated. If no error condition is triggered at step 284, then the reservation ring is free to operate safely.

F.4 Automatic Ring Sizing Using a Detection Circuit

Figure 30:
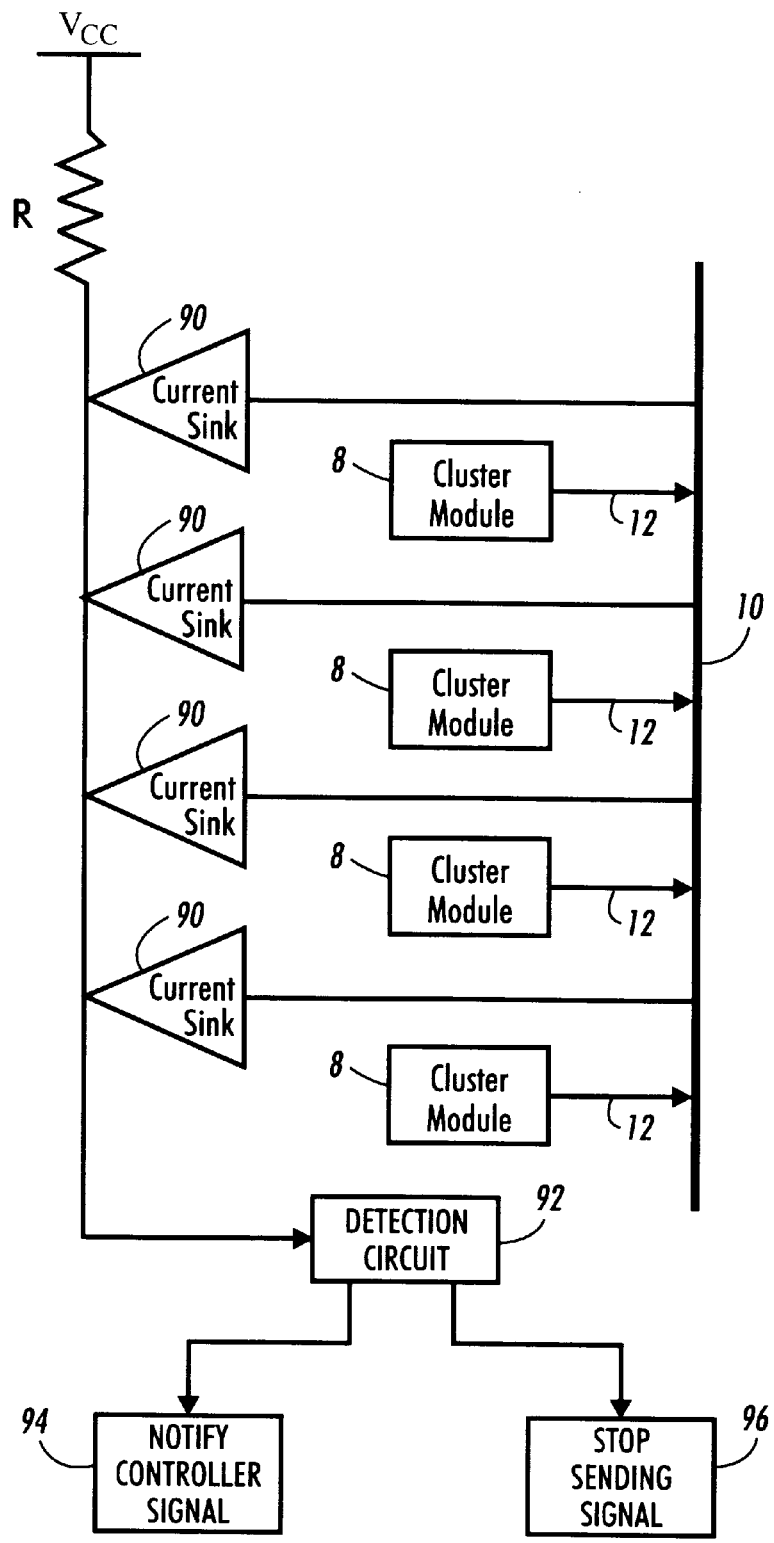
FIG. 30 schematically illustrates again yet another embodiment for automatically sizing the length of a reservation ring using a detection circuit.

FIG. 30 illustrates again yet another embodiment for automatically sizing the length of a reservation ring using a detection circuit 92. In FIG. 30, the detection circuit 92 detects when more than a predetermined number of input channels 12 of cluster modules 8 attempt to write at one time to switching network 10 (e.g. a bus). Each input channel is provided with a corresponding current sink 90. The current sinks 90 of the input channels 12 are coupled to line 95. When an input channel 12 attempts to write to switching network 10, its corresponding current sink 90 pulls down a signal sent to detection circuit 92. The detection circuit 92 outputs a signal 94 to notify the control software when the number of input channels 12 attempting to access switching network 10 exceeds a predetermined number of input channels at which switching network 10 can safely operate. Besides outputting a notify controller signal 94, detection circuit 92 outputs a stop sending signal 96 to notify each input channel 12 in the switch to stop accessing switching network 10.

In one instance of this embodiment, detection circuit 90 is a voltage comparator. One of the inputs of the voltage comparator receives a signal from a reference voltage and the other receives a signal from line 95. The line 95 is coupled to current sinks 90 which can be implemented using open collector logic. The accuracy or resolution of detection circuit 92 is a function of the number of detection circuits 90 that are coupled to line 95. If the number of detection circuits 90 is too large then the detection circuit 92 may be unable to detect when the allowed number of input channels 12 attempting to write to switching network 10 exceeds the predetermined safe number of input channels.

G. Summary

Parts of the disclosed switch may be readily implemented in software using software development environments that provide portable source code that can be used on a variety of hardware platforms. Alternatively, the disclosed switch may be implemented partially or fully in hardware using standard logic circuits. Whether software or hardware is used to implement the switch varies depending on the speed and efficiency requirements of the switch and also the particular function and the particular software or hardware systems and the particular microprocessor or microcomputer systems being utilized. The switch, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

We claim:

1. A switch, comprising:

a switching network having N input channels and M output channels, where N and M are integers greater than one; said switching network performing routing operations each switch cycle for routing up to K data packets to each of the M output channels from selected ones of the N input channels, where K is an integer greater than one; and Q cluster modules being coupled to the N input channels and the M output channels of said switching network; each of said Q cluster modules being coupled to at least one of different ones of I input ports and less than K of different ones of J output ports, where I is an integer at least equal to N, and J is an integer greater than M; the coupling of said Q cluster modules with said switching network consolidating a speedup factor of "k"= (K*M)/J per output port into a speedup factor of K per cluster module;

wherein each of said Q cluster modules coact with said switching network to route as few as zero and as many as K fixed sized data packets to selected ones of the J output ports from the I input ports each switch cycle of said switching network; each of said Q cluster modules sharing, each switch cycle, the speedup factor of K among the selected ones of the J output ports that are coupled thereto to increase aggregate bandwidth of data packet traffic through said switch.

2. The switch according to claim 1, further comprising a reservation ring for resolving conflicts between the I input ports when more than K input ports contend for an identical output port during a switch cycle.

3. The switch according to claim 2, wherein said reservation ring further comprises an arbitration unit coupled to each input channel.

4. The switch according to claim 2, wherein said reservation ring resolves conflicts between the I input ports when more than K input ports contend for an identical output channel of said switching network during a switch cycle.

5. The switch according to claim 1, wherein said switching network is a bus.

6. The switch according to claim 5, wherein said bus time multiplexes K fixed-sized data packets each switch cycle to designated ones of the M output channels.

7. The switch according to claim 1, wherein said switching network comprises a batcher followed by K banyan routing networks.

8. The switch according to claim 7, wherein said K routing networks route up to K fixed-sized data packets to designated ones of the M output channels during a switch cycle.

9. The switch according to claim 1, wherein said switching network comprises an N×(K * M) crossbar switch.

10. The switch according to claim 1, wherein I is equal to J.

11. The switch according to claim 1, wherein the data packets are fixed-sized data packets.

12. The switch according to claim 1, wherein the data packets have a maximum permissible transport unit size.

13. The switch according to claim 1, wherein each cluster module in said Q cluster modules further comprises:

an interface control unit for receiving data packets from packet sources;

a switching network interface unit for receiving data packets from said switching network; and a memory for storing the fixed-sized data packets received by said interface control unit and said switching network interface.

14. The switch according to claim 1, further comprising means for regulating how many data packets are delivered to each output port of a cluster module during each switch cycle.

15. The switch according to claim 14, wherein said regulating means adjusts how many data packets are delivered to each output port of a cluster module between switch cycles to account for changing traffic patterns.

16. The switch according to claim 14, wherein said regulating means permits a maximum of k_alloc packets to be delivered to a single output port of a cluster module during each switch cycle, where k_alloc is less than K.

17. The switch according to claim 16, wherein the maximum k_alloc varies for different ports of a cluster module.

18. The switch according to claim 1, wherein said switching network routes from the I input ports up to K data packets to each of the M output channels.

19. The switch according to claim 18, wherein said switching network routes a maximum number of data packets to different ones of the J output ports from the I input ports, where the maximum number of data packets is less than K.

20. The switch according to claim 19, wherein the maximum number of data packets varies between output ports.

21. The switch according to claim 1, further comprising output buffers for matching date packet transfer rates between the output channels and output ports.

22. The switch according to claim 1, further comprising input buffers for matching data packet transfer rates between the input ports and input channels.

23. A switch for routing data packets from designated ones of M input pots to designated ones of M output pots, comprising:

a switching network having N input channels, and N output channels; said switching network routing up to K data packets to each of the N output channels during a switch cycle of said switch, where K is an integer greater than one;

an arbiter for resolving conflicts between the N input channels when more than K of the N input channels contend for a single one of the N output channels; and Q cluster modules operatively coupled to said arbiter and said switching network; each of the Q cluster modules receiving at most K data packets from selected ones of the N input channels through said switching network during the switch cycle; the Q cluster modules servicing the M input ports and the M output ports, where M is an integer greater than N; the coupling of said Q cluster modules with said switching network consolidating a speedup factor of "k"=(K* N)/M per output port into an aggregate speedup factor of K per cluster module; said Q cluster modules increasing average throughput of said switch by routing up to K fixed-sized data packets to selected ones of the M output ports during the switch cycle.

24. A switch for routing data packets from designated ones of M input ports to designated ones of M output ports, comprising:

a switching network having N input channels, and N output channels; said switching network having sufficient bandwidth for routing up to B data packets to the N output channels during a switch cycle of said switch; each of said N output channels having a specified channel speedup allocated from the bandwidth of said switching network;

Q cluster modules operatively coupled to said switching network; the Q cluster modules receiving data packets at a rate up to the specified channel speedup from selected ones of the N input channels through said switching network during the switch cycle; the Q cluster modules servicing the M input ports and the M output ports; the specified channel speedup of each cluster module being allocated independently between each output port coupled thereto, to define allocated port speedup; the coupling of said Q cluster modules with said switching network consolidating a speedup factor of "k"=B/M Per output sort into the bandwidth B of said switching network; and an arbiter for dynamically adjusting the specified channel speedup and the allocated port speedup between the N output channels and the M output ports each switch cycle to increase aggregate bandwidth of traffic through said switch.

* * * * *

UNITED STATES PATENT AND TRADEMARK OFFICE
CERTIFICATE OF CORRECTION

| | |
|---|---|
| PATENT NO. | : 5,912,889 |
| APPLICATION NO. | : 08/754727 |
| DATED | : June 15, 1999 |
| INVENTOR(S) | : Bryan T Preas et al. |

Page 1 of 1

It is certified that error appears in the above-identified patent and that said Letters Patent is hereby corrected as shown below:

Column 1, line 16, insert as a new paragraph:

This invention was made with Government support under DABT63-92-C-0034 awarded by DARPA. The Government has certain rights in this invention.

Signed and Sealed this

Twenty-fifth Day of March, 2008

JON W. DUDAS
*Director of the United States Patent and Trademark Office*